(12) United States Patent
Sekine

(10) Patent No.: US 9,239,499 B2
(45) Date of Patent: Jan. 19, 2016

(54) LIQUID CRYSTAL DISPLAY APPARATUS AND LIGHT-EMITTING DISPLAY APPARATUS

(71) Applicant: NLT Technologies, Ltd., Kanagawa (JP)

(72) Inventor: Hiroyuki Sekine, Kanagawa (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 36 days.

(21) Appl. No.: 14/308,021

(22) Filed: Jun. 18, 2014

(65) Prior Publication Data

US 2014/0375932 A1  Dec. 25, 2014

(30) Foreign Application Priority Data

Jun. 20, 2013 (JP) ................................. 2013-129194

(51) Int. Cl.
| | |
|---|---|
| *G02F 1/1335* | (2006.01) |
| *G02F 1/1343* | (2006.01) |
| *G02B 27/22* | (2006.01) |
| *H04N 13/04* | (2006.01) |

(52) U.S. Cl.
CPC ...... *G02F 1/134336* (2013.01); *G02B 27/2214* (2013.01); *H04N 13/0409* (2013.01)

(58) Field of Classification Search
CPC .. G02B 27/2214; G02B 27/22; G02B 27/225; G02B 27/60; G02B 3/005; G02B 3/06; G02B 5/201; G02B 2027/0134; H04N 13/0404; H04N 13/0415; H04N 13/0409; H04N 13/0422; H04N 13/0406; H04N 13/0402; H04N 13/00; H04N 13/0011; H04N 13/0018; H04N 13/0025; H04N 13/047; G02F 1/1335; G02F 1/133526; G02F 1/134326; G02F 1/134336; G02F 1/133514; G02F 1/1313; G02F 1/133615; G02F 1/134309; G02F 1/1343; G02F 1/1362; G02F 2201/52; G09G 3/3413; G09G 3/3607; G09G 3/3622; G09G 3/3648; G09G 3/00; G09G 3/2074; G09G 2300/0439; G09G 2300/0465; G09G 2300/0478; G09G 2320/0209; B29D 11/00278; B41M 3/003; B60K 2350/2017
USPC ............ 359/463, 462, 619; 349/15, 108, 200, 349/106, 95, 144, 145, 146; 345/419, 87, 345/697, 88, 92, 55, 694; 348/51, 59, 348/E13.029, E13.001, E13.026, E13.033, 348/E13.043, E13.067
See application file for complete search history.

(56) References Cited

U.S. PATENT DOCUMENTS

2012/0249901 A1* 10/2012 Sekine ............... G02B 27/2214
                                                                349/15

FOREIGN PATENT DOCUMENTS

| JP | 10-186294 | 7/1998 |
|---|---|---|
| JP | 2005-208567 | 8/2005 |
| JP | 2006-030512 | 2/2006 |
| JP | 2008-092361 | 4/2008 |
| JP | 2012-215830 | 11/2012 |

* cited by examiner

*Primary Examiner* — Thoi Duong
(74) *Attorney, Agent, or Firm* — Young & Thompson

(57) ABSTRACT

Provided are a liquid crystal display apparatus and a light-emitting display apparatus. The liquid crystal display apparatus includes a first substrate, a second substrate, a liquid crystal layer, sub-pixels and an array of cylindrical lenses. Each sub-pixel includes an opening section or sections whose total length taken along the first direction at each of positions ranging in the second direction is constant. In each row of the sub-pixels, the opening sections are arranged such that moving average values of positions of a center of gravity of the opening sections fluctuate within a predetermined range, where the moving average values are calculated by obtaining positions of the center of gravity of the opening sections taken along the first direction at plural positions ranging in the second direction and by averaging the obtained positions within a spot width of the cylindrical lenses for each of the positions ranging in the second direction.

6 Claims, 16 Drawing Sheets

FIG. 23          RELATED ART
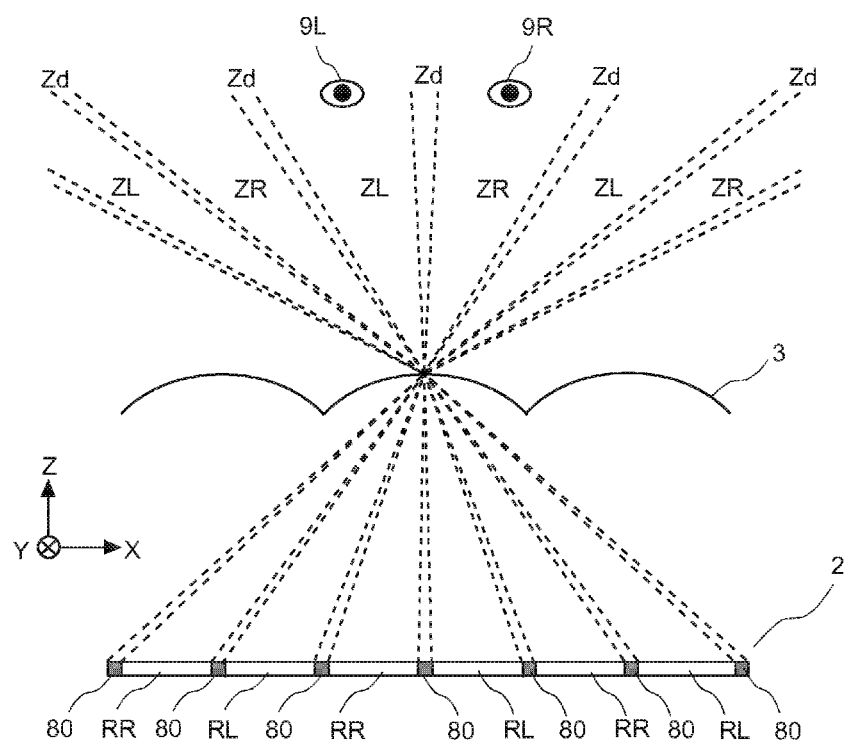
FIG. 24          RELATED ART
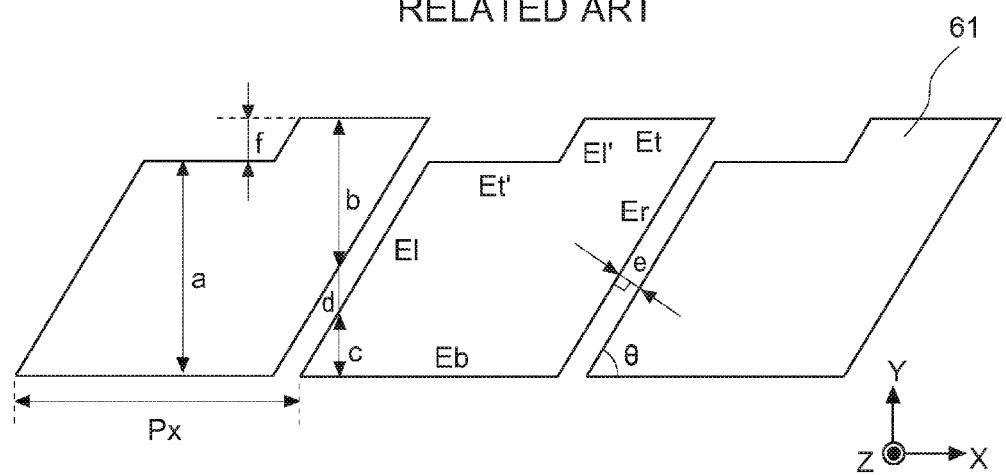

LIQUID CRYSTAL DISPLAY APPARATUS AND LIGHT-EMITTING DISPLAY APPARATUS

TECHNICAL FIELD

The present invention relates to a liquid crystal display apparatus and a light-emitting display apparatus, and especially relates to a liquid crystal display apparatus and a light-emitting display apparatus for displaying three-dimensional images.

BACKGROUND

In recent years, demands for display apparatuses which can display three-dimensional images, namely, 3D images are rapidly increasing. Various studies about methods to display three-dimensional images have been conducted in past days, and still now, research and development about those are conducted briskly. As methods to display 3D images, which are currently considered notable, there have been proposed methods using binocular parallax.

Three-dimensional image display apparatuses using binocular parallax are roughly classified into two groups using the following methods. One is a method to create different images into left and right eyes by using special glasses (hereinafter, referred as "a method using glasses"). The other is a method to project different images for right and left eyes created by a three-dimensional image display apparatus at spatially separated regions without using special glasses (refereed as "a glasses-less method").

The former "method using glasses" is a method suitable to the situation that plural observers view a relatively large screen at the same time and is used for movie theaters and televisions. The latter "glasses-less method" is a method suitable to the situation that a single observer views a relatively small screen. This method which allows observers to view three-dimensional images easily because observers are free from bother in wearing special glasses and is expected to be applied to various displays of mobile phones, digital still cameras, video cameras and notebook computers.

As an example of display apparatuses of the glasses-less method which can display three-dimensional images, Japanese Unexamined Patent Application Publication (JP-A) No. 2006-030512 discloses the following liquid crystal display apparatus. As shown in FIG. 21, there are arranged 3×3 pixels 6 in the X-axis and Y-axis directions in the disclosed liquid crystal display apparatus to form a matrix. One of the pixels 6 is composed of 6 sub-pixels RR, RL, GR, GL, BR and BL. In the liquid crystal display apparatus, one pixel composed of the six sub-pixels 61 emits two sets of light fluxes to be projected onto the left and right eyes of an observer, where each set of light fluxes is composed of three light fluxes in red (R), green (G) and blue (B) which construct a color image. Sub-pixel RR is a sub-pixel for displaying a red image for the right eye, and sub-pixel RL is a sub-pixel for displaying a red image for the left eye. Similarly, sub-pixels GR, GL, BR and BL are a sub-pixel for displaying a green image for the right eye, a sub-pixel for displaying a green image for the left eye, a sub-pixel for displaying a blue image for the right eye and a sub-pixel for creating a blue image for the left eye, respectively.

The liquid crystal display apparatus has a structure including liquid crystal panel 2 and lens-array sheet 3 put on the liquid crystal panel 2 (see FIG. 22 and FIG. 23). The liquid crystal panel 2 includes, as shown in FIG. 22, a matrix of pixels wherein sub-pixels RR, RL, GR, GL, BR and BL are arrayed in the X-axis direction at pitch of 2×Ppx and in the Y-axis direction. The lens-array sheet 3 includes cylindrical lenses 31 arrayed in the X-axis direction at pitch of Plx to form an array. As shown in FIG. 23, red light for the right eye emitted from sub-pixel RR is projected onto region ZR in the space through the cylindrical lenses and red light for the left eye emitted from sub-pixel RL is also projected onto region ZL in the space through the cylindrical lenses. When an observer comes to the position that right eye 9R of the observer is in region ZR and left eye 9L of the observer is in region ZL, the observer sees only an image for the right eye with right eye 9R and sees only an image for the left eye with left eye 9L, which allows the observer to perceive a three-dimensional image based on the images displayed by the liquid crystal display apparatus. Further, by displaying the same image on both of sub-pixels for the right eye and sub-pixels for the left eye, the liquid crystal display apparatus allows an observer to perceive a two-dimensional image. In view of the existing state that apparatuses for displaying images do not always display three-dimensional images and the frequency of displaying three-dimensional images is less than that of displaying two-dimensional images, it is important for display apparatuses to have a property to display two-dimensional images additionally to three-dimensional images for reasons of actual use.

However, the above-described liquid crystal display apparatus disclosed in JP-A No. 2006-030512 caused a problem that observers easily perceive moiré patterns when the liquid crystal display apparatus displays two-dimensional images thereon. Descriptions about a mechanism of generation of the moiré patterns will be given below. Cylindrical lenses do not have lens effect in the direction of the lens axis but have lens effect in the direction perpendicular to the lens axis. Under the condition shown in FIG. 22, the direction of the lens axis corresponds to the Y-axis direction and the direction perpendicular to the lens axis corresponds to the X-axis direction. When liquid crystal panel 2 is put at a position around the focal point of cylindrical lenses 31 of lens-array sheet 3, as shown in FIG. 23, light emitted from the liquid crystal panel 2 is projected through cylindrical lens 31 in the direction inclining at an angle against the Z axis, and the angle is defined depending on the relationship of the top of the cylindrical lens and the position of the light along the X axis on the liquid crystal panel 2. Therefore, when the intensity of light emitted from the liquid crystal panel 2 varies corresponding to its position on the X axis, the intensity of the emitted light varies corresponding to the light-emission angle. That is, under the condition that the liquid crystal panel 2 has light-shielding sections 80 which do not emit light and each light-shielding section 80 extends in the Y-axis direction, such the condition makes angular directions in which light does not exist among angular directions of light emitted from the liquid crystal panel 2, and those angular directions are perceived by an observer as black regions. That is the mechanism of generation of the moiré patterns. A liquid crystal display apparatus employing a parallax barrier in place of the cylindrical lenses also causes a similar condition.

Since each of the above-described light-shielding sections 80 is located between two neighboring sub-pixels arranged along the X-axis direction in the liquid crystal panel 2, each of the regions which looks black (regions Zd in FIG. 23) exists between an area where an image for the left eye is projected and an area where an image for the right eye is projected. Under the situation that the liquid crystal display apparatus displays a three-dimensional image, an observer moves his or her face to an appropriate position so as to adjust the left eye and the right eye to appropriate positions for perceiving an three-dimensional image based on displayed images. However, under the situation that the liquid crystal display apparatus displays a two-dimensional image, it is difficult for an observer to find the appropriate positions. Therefore, when the observer's face moves to a certain place, the eyes can be located in the regions which look black, which can deteriorate the display quality of the display apparatus significantly.

As a method to restrict the moiré patterns, there is known a method disclosed by JP-A No. H10-186294. FIG. 24 illustrates sub-pixels 61 of a liquid crystal display apparatus which can display three-dimensional images disclosed in JP-A No. H10-186294. As described above, when the intensity of light emitted from the liquid crystal panel varies corresponding to its position on the X-axis, it makes moiré patterns. The intensity of light emitted from a certain position on the X axis in the liquid crystal panel corresponds to the size ratio of an opening section and a light-shielding section in a slice obtained by cutting the opening sections of the liquid crystal display apparatus along the Y-axis direction at the certain position on the X axis. Therefore, the issue of the moiré patterns can be solved by keeping the size ratio of an opening section and a light-shielding section constant regardless of its position on the X-axis. Sub-pixels 61 disclosed by JP-A No. H10-186294 are arranged with light-shielding sections which extend along the Y axis with inclining at angle θ against the X axis. Assuming that the inclining light-shielding sections are "e" in width (see FIG. 24), width "d" of the size of the inclining light-shielding sections taken along the Y-axis direction can be expressed by the following expression (1).

$$d = e/\cos \theta \quad (1)$$

The total size of opening sections, taken along the Y-axis direction, in an area including an inclining light-shielding section, is given by the total sum of sizes "b" and "c" shown in FIG. 24. As far as side "Et" and side "Eb" defining the form of the opening section are parallel with each other, when the total sum of the sizes is taken at any of positions ranging in the X-axis direction, the total sum of the sizes becomes constant regardless of the positions. On the other hand, in an area including no inclining light-shielding section, as far as side "Et'" and side "Eb" defining the form of the opening section are parallel with each other, size "a" of the opening section shown in FIG. 24 is constant regardless of the positions ranging in the X-axis direction and agrees with the total sum of sizes "b" and "c", by adjusting size "f" to agree with size "d" (see FIG. 24). Herein, sides "El", "El'" and "Er" are parallel with each other.

There are known any other methods to restrict moiré patterns other than the method disclosed by JP-A No. H10-186294 (for example, JP-A Nos. 2005-208567, 2008-092361 and 2012-215830).

However, it has been found that a problem of "a sense of horizontal stripes" can be caused when the pixel layout for restricting the moiré patterns disclosed in JP-A No. H10-186294 or others, is applied to the liquid crystal display apparatus which can display three-dimensional images disclosed in JP-A No. 2006-030512. That is, under the condition that a single color is displayed uniformly over the entire screen, observers feel that pixel rows neighboring in the Y-axis direction have different luminance and/or different colors from one another on the screen and perceive thin horizontal stripes on the screen, which is referred as "a sense of horizontal stripes" hereinafter. Such the sense of horizontal stripes is felt by observers strongly when the observers are going to observe details in a narrow area on a display apparatus, and such the phenomenon makes the display quality of the display apparatus deteriorate significantly. The present invention seeks to solve the problem.

SUMMARY

In view of the above problem, there are provided an illustrative liquid crystal display apparatus and an illustrative light-emitting display apparatus both capable of displaying three-dimensional images with restricting generation of moiré patterns and generation of a sense of horizontal stripes, as embodiments of the present invention.

An illustrative display apparatus reflecting one aspect of the present invention is a liquid crystal display apparatus comprising: a first substrate; a second substrate; a liquid crystal layer put between the first substrate and the second substrate; an array of sub-pixels arrayed in a first direction and a second direction; and an array of cylindrical lenses arranged on one of the first substrate and the second substrate, where the first direction and second direction are perpendicular to each other. The cylindrical lenses extend in the first direction and are arrayed in the second direction for separating incident light fluxes in the second direction. Each of the sub-pixels includes an opening section or opening sections whose total length taken along the first direction at each of positions ranging in the second direction is almost constant regardless of the positions ranging in the second direction. In each row of the sub-pixels arrayed in the second direction, the opening sections are arranged such that moving average values of positions of a center of gravity of the opening sections fluctuate within a range equal to or less than about 5 μm, where the moving average values are calculated by obtaining positions of the center of gravity of the opening sections taken along the first direction at a plurality of positions ranging in the second direction and by averaging the positions of the center of gravity within a spot width for each of the plurality of positions ranging in the second direction, and the spot width is a width of a converged light formed on the liquid crystal layer when a parallel light flux enters one of the cylindrical lenses.

An illustrative display apparatus reflecting another aspect of the present invention is a liquid crystal display apparatus wherein each of the above-described sub-pixels includes a color filter (color resist) whose color is same as that of other sub-pixels neighboring in the second direction and is different from that of other sub-pixels neighboring in the first direction.

An illustrative display apparatus reflecting another aspect of the present invention is a light-emitting display apparatus comprising an array of sub-pixels arrayed in a first direction and a second direction; and an array of cylindrical lenses arranged on one of the first substrate and the second substrate, where the first direction and second direction are perpendicular to each other. The cylindrical lenses extend in the first direction and are arrayed in the second direction for separating incident light fluxes in the second direction. Each of the sub-pixels includes a light emitting section or light emitting sections whose total length taken along the first direction at each of positions ranging in the second direction is almost constant regardless of the positions ranging in the second direction. In each row of the sub-pixels arrayed in the second direction, the light emitting sections are arranged such that moving average values of positions of a center of gravity of the light emitting sections fluctuate within a range equal to or less than about 5 μm, where the moving average values are calculated by obtaining positions of the center of gravity of the light emitting sections taken along the first direction at a plurality of positions ranging in the second direction and by averaging the positions of the center of gravity within a spot width for each of the plurality of positions ranging in the second direction, and the spot width is a width of a converged light formed on the light-emitting sections when a parallel light flux enters one of the cylindrical lenses.

An illustrative display apparatus reflecting another aspect of the present invention is a light-emitting display apparatus wherein the light emitting section or light emitting sections of each of the above-described sub-pixels emit light whose color is same as that of other sub-pixels neighboring in the second direction and is different from that of other sub-pixels neighboring in the first direction.

Other features of illustrative embodiments will be described below.

BRIEF DESCRIPTION OF THE DRAWINGS

Embodiments will now be described, by way of example only, with reference to the accompanying drawings which are meant to be exemplary, not limiting, and wherein like elements numbered alike in several figures, in which:

FIG. 23 is a diagram for illustrating optical paths of light emitted from a conventional liquid crystal display apparatus; and FIG. 24 is a plan view illustrating opening sections of pixels of a conventional liquid crystal display apparatus.

DETAILED DESCRIPTION

Figure 1:
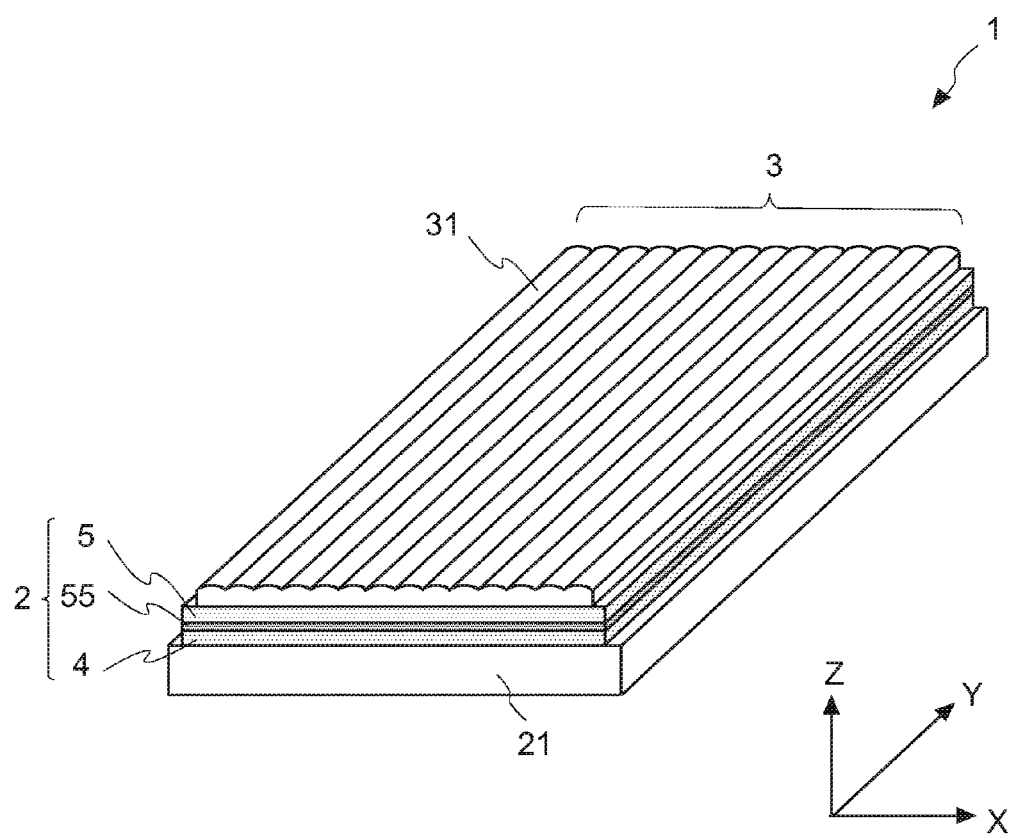
FIG. 1 is a perspective view illustrating a structure of a display apparatus relating to an embodiment of the present invention.

Illustrative embodiments of display apparatuses will be described below with reference to the drawings. In the drawings, the size and scale of each structural component have been changed appropriately for maintaining the clarity of the images. In FIGS. 2, 4, 10, 11, 12, 14, 16 and 20, components are hatched for illustrating different colors.

It will be appreciated by those of ordinary skill in the art that the description given herein with respect to those figures is for exemplary purposes only and is not intended in any way to limit the scope of potential embodiments may be resolved by referring to the appended claims.

According to illustrative display apparatuses as embodiments of the present invention, generation of moiré patterns and generation of a sense of horizontal stripes can be restricted and high-resolution three-dimensional images with a low 3D crosstalk can be realized.

A display apparatuses relating to the present embodiment can display an image for the left eye and an image for the right eye, and can make an observer perceive a three-dimensional image by projecting different images onto the observer's left and right eyes, respectively.

As shown in FIG. 1, display apparatus 1 relating to the present embodiment includes liquid crystal panel 2, lens array sheet 3 and backlight 21. The lens array sheet 3 composed of an array of cylindrical lenses 31 is put on liquid crystal panel 2 (in other words, on one of opposing substrates forming the liquid crystal panel 2). Backlight 21 is put on the opposite side of the liquid crystal panel 2 from the side where the cylindrical lenses 31 are arranged.

Respective cylindrical lenses 31 forming lens array sheet 3 extend in the Y-axis direction and are arranged in the X-axis direction to form an array. Cylindrical lenses 31 do not have lens effect in the Y-axis direction (the direction in which the cylindrical lenses extend) but have lens effect only in the X-axis direction. In other words, cylindrical lenses 31 work as an optical component for separating light fluxes coming from pixels arranged on liquid crystal display panel 2 in the X-axis direction.

Liquid crystal panel 2 has a structure that liquid crystal layer 55 are put between TFT (Thin Film Transistor) substrate 4 and CF (Color Filter) substrate 5, where TFT substrate 4 includes TFTs arranged in a matrix thereon, and CF substrate 5 includes color filters each composed of a color resist in one of R, G and B colors and further includes a black matrix. On the opposite side of each of the TFT substrate 4 and CF substrate 5 from their surfaces touching with liquid crystal layer 55, an optical film such as a polarization plate, which is not illustrated, is arranged.

In liquid crystal panel 2, there are provided sub-pixels arranged in a two-dimensional matrix extending in the X-axis direction and the Y-axis direction, for displaying images for the right eye and the left eye. The focal point of each cylindrical lens 31 is set around the liquid crystal display layer 55. When light fluxes coming from the sub-pixels neighboring in the X-axis direction enter cylindrical lens 31, the cylindrical lens 31 can separate the incident light fluxes in the X-axis direction.

Figure 2:
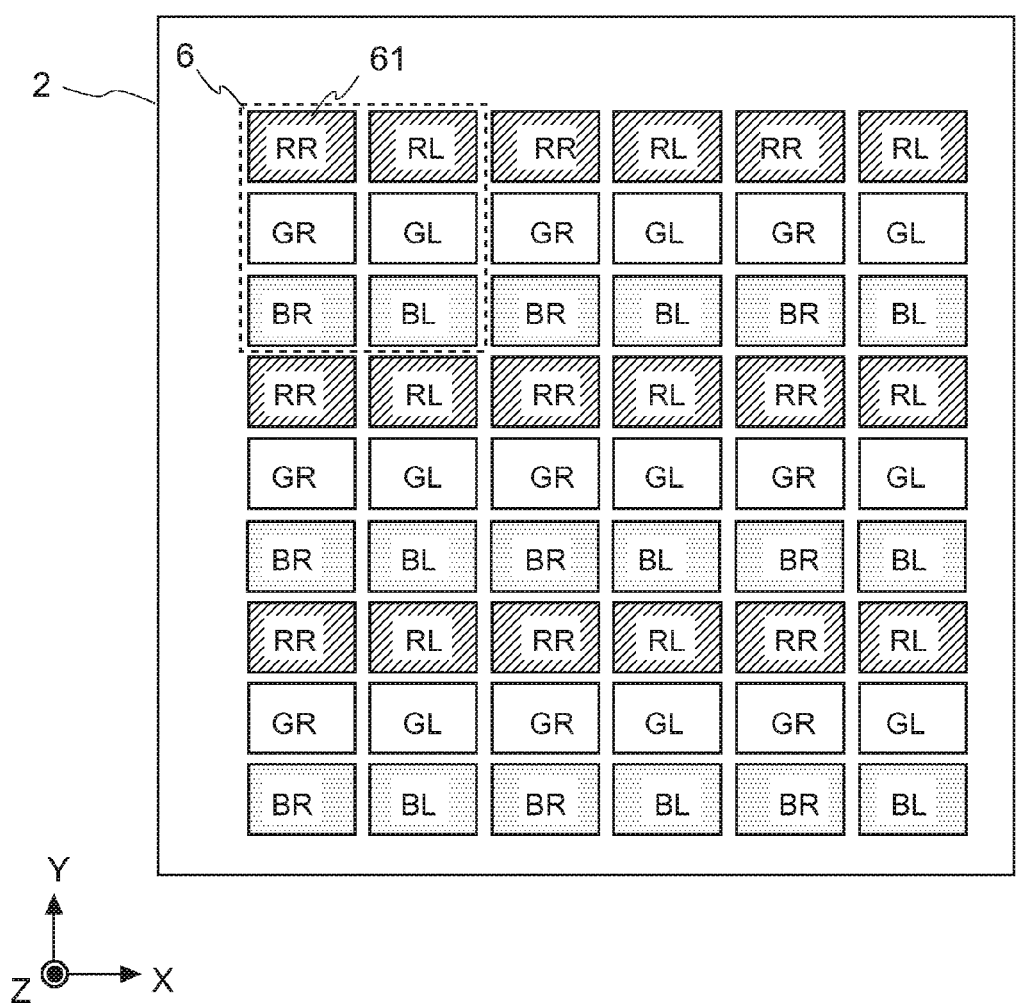
FIG. 2 is a diagram schematically illustrating a pixel arrangement of a display apparatus relating to the embodiment of the present invention.

FIG. 2 is a diagram schematically illustrating an arrangement of pixels of liquid crystal panel 2. The liquid crystal panel 2 has 3×3 pixels 6 arrayed in the X-axis direction and the Y-axis direction. Each of pixels 6 is composed of six sub-pixels 61 arranged in a matrix. The six sub-pixels 61 forming one pixel 6 are arranged as sub-pixels RR, RL, GR, GL, BR and BL shown in FIG. 2. Sub-pixel RR is a sub-pixel for displaying a red image for the right eye and sub-pixel RL is a sub-pixel for displaying a red image for the left eye. Similarly, sub-pixels GR, GL, BR and BL are a sub-pixel for displaying a green image for the right eye, a sub-pixel for displaying a green image for the left eye, a sub-pixel for displaying a blue image for the right eye and a sub-pixel for displaying a blue image for the left eye. As can be seen from FIG. 2, sub-pixels arrayed in the X-axis direction to form a row, display images of the same color, and such the rows of sub-pixels displaying images of R, G and B colors are arranged in the Y-axis direction in this order of colors.

Figure 3:
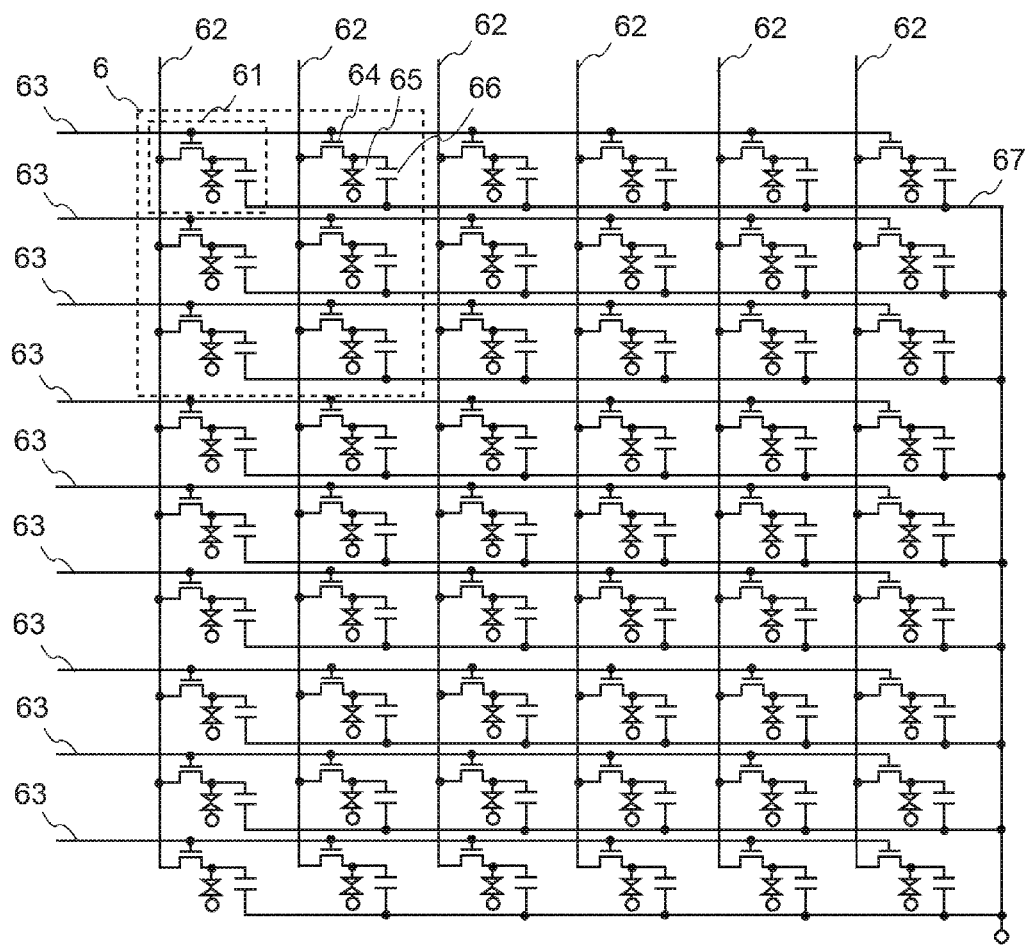
FIG. 3 is a circuit diagram illustrating a circuit structure of the display apparatus relating to the embodiment of the present invention.

FIG. 3 is a diagram illustrating a circuit structure of liquid crystal panel 2. Each sub-pixel 61 is composed of at least TFT 64, liquid crystal capacitance 65 and storage capacitance 66. There is provided one gate line 63 for each row of sub-pixels 61 arrayed in the X-axis direction, to be connected with gate terminals of TFTs 64 of all the sub-pixels 61 in the corresponding row. There is further provided one data line 62 for each column of sub-pixels 61 arrayed in the Y-axis direction, to be connected with source terminals of TFTs 64 of all the sub-pixels in the corresponding column. Each liquid crystal capacitance 65 is composed of a pixel electrode and a common electrode, and the pixel electrode is connected with a drain terminal of TFT 64. The common electrode is common to all the sub-pixels and is arranged on the counter substrate (CF substrate 5). One of two types of electrode forming each storage capacitance 66, is connected with a drain terminal of TFT 64 and the other is connected with storage capacitance line 67.

The above-described circuit structure is an example for a display apparatus employing a TN (Twisted Nematic) mode or a VA (Vertical Alignment) mode as its liquid crystal mode. In the case that the display apparatus employs an IPS (In Plane Switching) mode or a FFS (Fringe Field Switching) mode, the common electrode is arranged also on TFT substrate 4.

Figure 4:
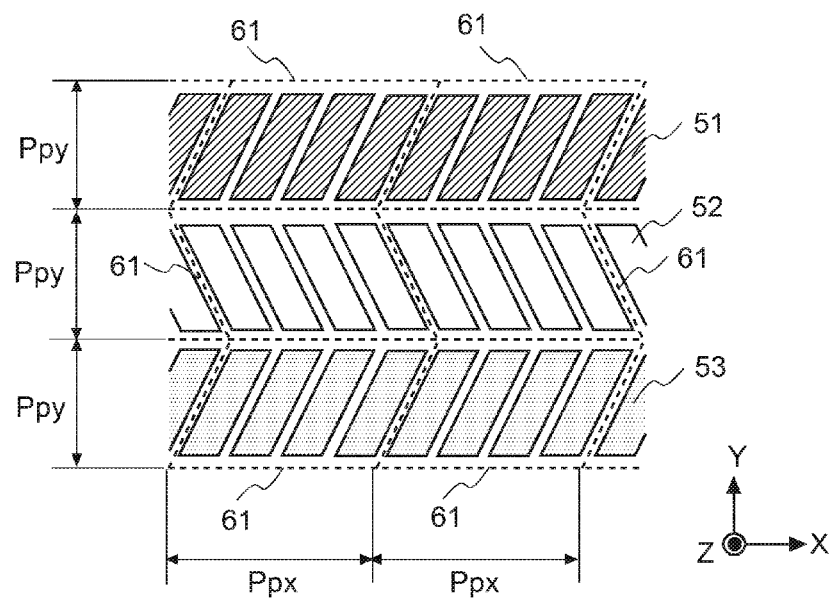
FIG. 4 is a diagram illustrating a layout of opening sections of the display apparatus relating to the embodiment of the present invention.

FIG. 4 is a diagram illustrating an example of a layout of opening sections of one pixel 6 in which moiré patterns have been restricted. One pixel 6 is composed of six sub-pixels 61, and the sub-pixels 61 are arranged at pitch Ppx in the X-axis direction and pitch Ppy in the Y-axis direction. Sub-pixels 61, which are arrayed in the X-axis direction to form each row, are equipped with corresponding color resists, that is, one of R-resists 51 for transmitting red light, G-resists 52 for transmitting green light and B-resists 53 for transmitting blue light.

Figure 5:
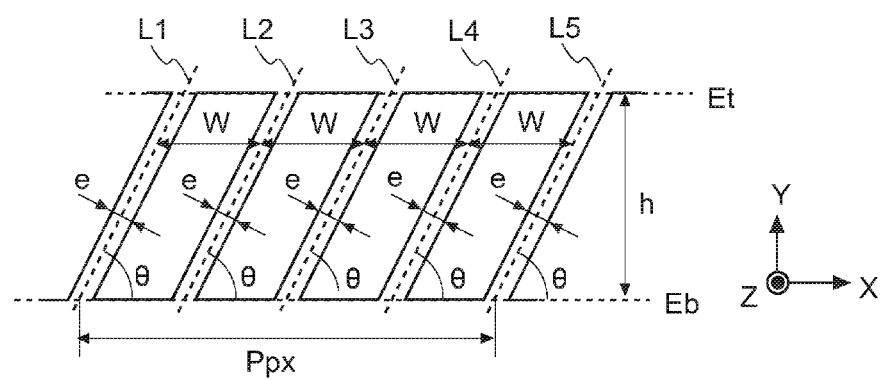
FIG. 5 is a diagram illustrating a layout of opening sections of a sub-pixel of the display apparatus relating to the embodiment of the present invention.

An opening section of a pixel means that a part transmitting light in each sub-pixel (a part where incident light is not shielded with a black matrix on the CF substrate or a component on the TFT substrate such as a wire). FIG. 5 illustrates a detailed layout of opening sections separated by light-shielding sections in one sub-pixel 61. In each sub-pixel 61, there are four parallelogram-shaped opening sections arranged at regular intervals "W". Each opening section has a set of sides in parallel with the X axis and the other set of sides inclining at angle θ against the X axis. The opening sections are separated in the X-axis direction by light-shielding sections, and the all the light-shielding sections, which include a light-shielding section in the boundary of another sub-pixel 61 neighboring in the X-axis direction, have the same width "e". Herein, the opening sections are arranged so that the values of W, θ, Ppx and h keep the relationship represented by the following expressions (2) and (3), where Ppx is the pitch of sub-pixels 61 in the X-axis direction, Ppy is the pitch of sub-pixels 61 in the Y-axis direction, and h is the height of the opening sections in the Y-axis direction.

$$h = W \times \tan\theta \quad (2)$$

$$Ppx = n \times W \quad (3)$$

In the above expression (3), "n" is an integer value being equal to or more than one, and "n" is four in the illustrative structure shown in FIG. 5. When the above expressions hold under the condition that the center lines of the light-shielding sections separating opening sections in the X-axis direction are denoted as L1 to L5 and the two lines which are parallel with the X axis and define the height of the opening sections in the Y-axis direction are denoted as Et and Eb, as shown in FIG. 5, the following construction is achieved. The X coordinate of the intersection of lines L1 and Et is the same as that of the intersection of lines L2 and Eb. Similarly, the X coordinate of the intersection of L2 and Et is the same as that of the intersection of L3 and Eb, the X coordinate of the intersection of L3 and Et is the same as that of the intersection of L4 and Eb, and the X coordinate of the intersection of L4 and Et is the same as that of the intersection of L5 and Eb. Since all the light-shielding sections have the same width, such the construction brings the following structural feature from the viewpoint of the geometric relationship. Each of slices, taken in the Y-axis direction at plural positions, of the opening sections arrayed in the X-axis direction includes a light-shielding section obliquely separating the opening sections neighboring in the X-axis direction. Therefore, the total height in the Y-axis direction of a row of the opening sections in each of the slices becomes constant as the following expression (4).

$$h - e/\cos\theta \quad (4)$$

Figure 6:
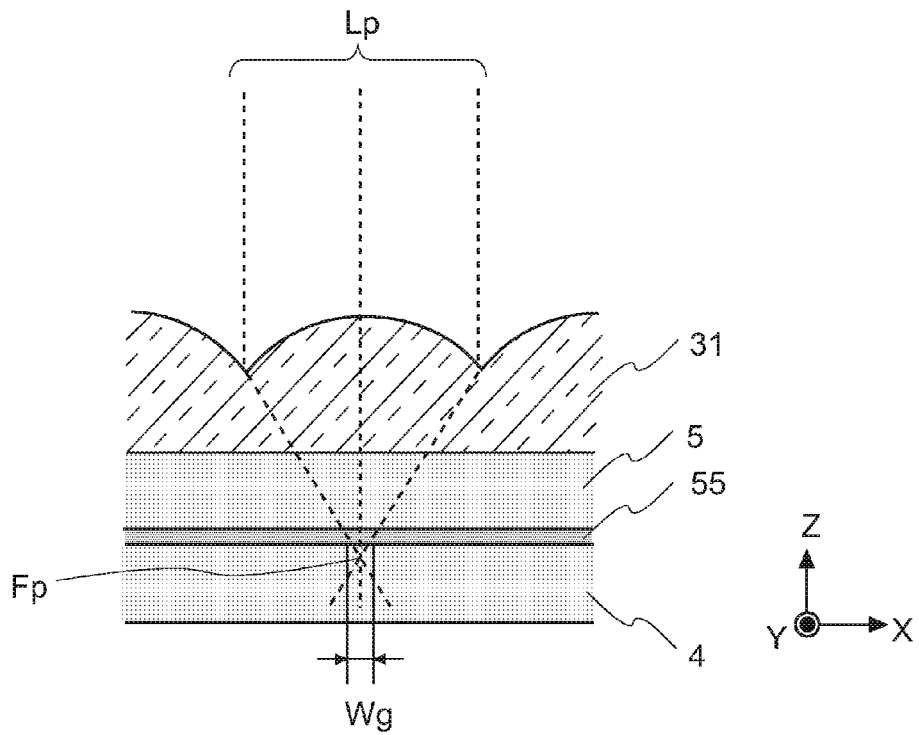
FIG. 6 is a diagram illustrating a cross section of the display apparatus relating to the embodiment of the present invention and characteristics of cylindrical lenses.

FIG. 6 is a sectional view of the display apparatus relating to the present embodiment, and partially illustrates a sectional view of the display apparatus taken along a line extending in the X-axis direction. Curvature of each cylindrical lens 31 is adjusted such that focal point Fp is located at a position around liquid crystal layer 55 put between TFT substrate 4 and CF substrate 5, where the focal point FP is a position where a light flux is converged through cylindrical lens 31 when parallel light flux Lp being parallel with the normal direction of the display apparatus enters cylindrical lens 31. The converged parallel light flux Lp which has converged through the cylindrical lens 31 has a certain size on liquid crystal layer 55, and this size is defined as spot width Wg. Since the thickness of liquid crystal layer 55 is sufficiently smaller than the focal length of cylindrical lens 31, the position of liquid crystal layer 55 actually used for defining the spot width Wg may be its surface touching with TFT substrate 4, the other surface touching with CF substrate 5, or the middle in the depth direction of liquid crystal layer 55. This spot width Wg does not mean an ideal value calculated by using the shape, refractive index and other values of cylindrical lens 31, but means a measured value including various kinds of tolerance and various kinds of aberrations, such as a tolerance of lens curvature caused in a manufacturing process of the cylindrical lenses. The spot width is obtained by using a parallel light flux actually entering the display apparatus and measuring the intensity distribution of the light at the position of the liquid crystal layer 55 (for example, measuring the full width of the converged light flux at half its maximum intensity or the full width of the converged light spot at $1/e^2$ of the maximum intensity).

Figure 7:
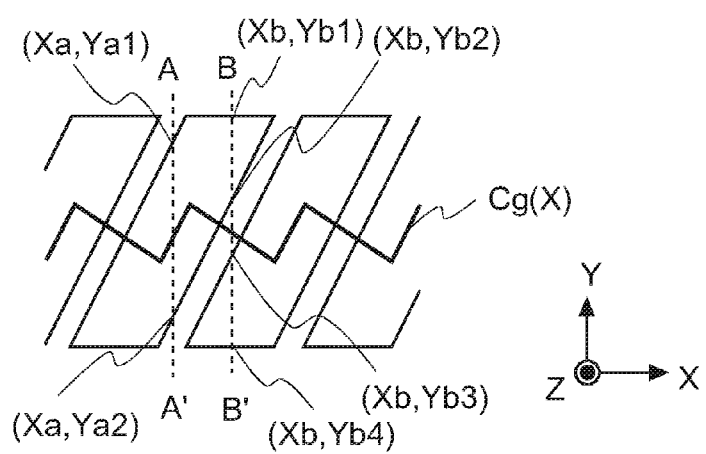
FIG. 7 is a diagram partially illustrating a layout of opening sections of a sub-pixel of the display apparatus relating to the embodiment of the present invention.

Hereinafter, there will be given descriptions about a definition of the center of gravity Cg(X) of an opening section, as a quantity representing where the opening section is located in the Y-axis direction, at an arbitrary one of positions ranging in the X-axis directions in each sub-pixel 61. FIG. 7 is a diagram partially illustrating opening sections of sub-pixel 61. As can be seen from FIG. 7, when the opening sections are sliced along lines being parallel with the Y axis, the slices can be divided in two groups depending on the sliced positions. One of the groups is a group of slices each including only one opening section sliced in the Y-axis direction, as the slice taken along the line A-A' of FIG. 7, and the other is a group of slices each including two opening sections sliced in the Y-axis direction, as the slice taken along the line B-B' of FIG. 7. Coordinates (Xa, Ya1) and coordinates (Xa, Ya2) are coordinates of the points where the line A-A' meets the boundary of an opening section. Coordinates (Xb, Yb1), coordinates (Xb, Yb2), coordinates (Xb, Yb3) and coordinates (Xb, Yb4) are coordinates of the points where the line B-B' meets the boundaries of two opening sections. As for the position where the slice includes only one opening section as the slice taken along the line A-A', the coordinates of the Y-axis of the center of gravity Cg of the opening section is given by the following expression (5) with using Ya1 and Ya2.

$$Cg(Xa) = (Ya1+Ya2)/2 \quad (5)$$

As for the position where the slice includes two opening sections as the slice taken along the line B-B', the coordinate of the Y-axis of the center of gravity Cg of the opening sections is similarly given by the following expression (6) with using Yb1, Yb2, Yb3 and Yb4.

$$Cg(Xb) = \frac{(Yb2 - Yb1) \times (Yb1 + Yb2) + (Yb4 - Yb3) \times (Yb3 + Yb4)}{2 \times (Yb2 - Yb1 + Yb4 - Yb3)} \quad (6)$$

The calculation of the expression (6) is to be done by additionally using opening sections of another sub-pixel 61 neighboring to the concerned sub-pixel 61 in the X-axis direction. The line Cg(X) in FIG. 7 shows the calculated values of Cg(X).

Next, values of Cgsma(X) are calculated, where the values of Cgsma(X) are calculated by averaging values of Cg(X) within the spot width Wg in the X-axis direction for positions ranging in the X-axis direction (calculating moving average values). This calculation is given by the following expression (7).

$$Cgsma(X) = \frac{1}{Wg} \int_{x-\frac{1}{2}Wg}^{x+\frac{1}{2}Wg} Cg(X) dX \quad (7)$$

Figure 8:
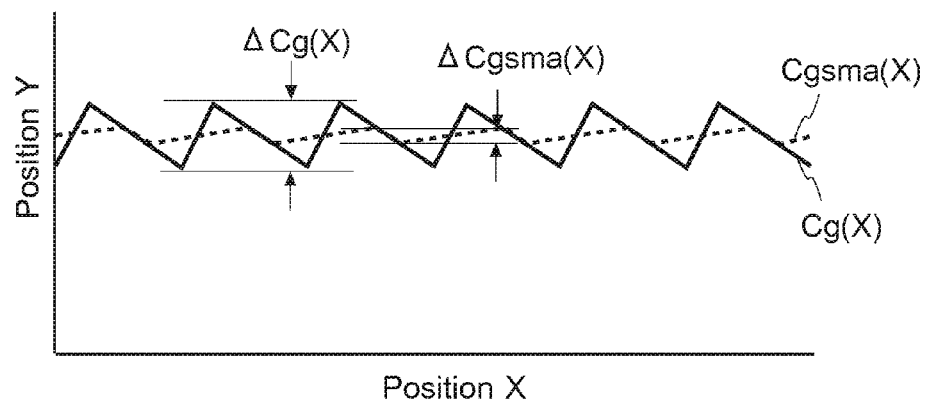
FIG. 8 is a graph illustrating positions of the center of gravity of opening sections of a row of sub-pixels and moving average values of the positions of the center of gravity of the opening sections, of the display apparatus relating to the embodiment of the present invention.

FIG. 8 is a graph showing a part of the calculation result of values of the center of gravity Cg(X) of opening sections of the display apparatus relating to the present embodiment and the moving average Cgsma(X) of those values. In FIG. 8, ΔCg(X) represents a fluctuation range of values of the center of gravity of the opening sections and ΔCgsma(X) represents a fluctuation range of the moving average of the values of the center of gravity of the opening sections. In the liquid crystal display apparatus relating to the present embodiment, properties of cylindrical lenses 31, angle θ and the number "n" of opening sections contained in each sub-pixel 61 (hereinafter, also referred as the number of partitions "n") have been defined so as to control the fluctuation range ΔCgsma(X) of the moving average values of positions of the center of gravity of the opening sections to be equal to or less than a certain value. In order to further control the 3D crosstalk in the adjustment, it is preferable that values of "W" and "Wg" are adjusted to be one third the value of PPx or less. The value of "W" can be adjusted by using the values of θ and "n".

The display apparatus relating to the present embodiment is driven as follows. A voltage such that TFTs 64 of sub-pixels 61 turn into a condition that electricity passes them is applied successively to respective gate lines 63 shown in FIG. 3. At the same time, a video signal is applied to respective data lines 62. Then, in one of rows of sub-pixels 61, the video signal is written into liquid crystal capacitance 65 and storage capacitance 66 through TFTs 64 and the voltage of the corresponding gate line 63 is changed into the voltage such that TFTs 64 turn into a condition that electricity does not pass them. Thereby, the written video signal is maintained by the row of sub-pixels 61. When this process is repeated for all the gate lines 63 successively, an image corresponding to one frame is written into the sub-pixels 61. When there is created the difference between the video signal to be written into sub-pixels RR, GR and BR for the right eye and the video signal to be written into sub-pixels RL, GL and BL for the left eye, corresponding to the disparity or parallax in those processes, an observer can perceive a three-dimensional image based on the displayed images.

The display apparatus relating to the present embodiment can display three-dimensional images having low 3D crosstalk with restricting moiré patterns and the sense of horizontal stripes. The reason will be described below.

A generation of moiré patterns is come from a variation of the intensity of light emitted from the liquid crystal panel depending on positions on the X axis. The intensity of light emitted from a certain position on the X axis on the liquid crystal panel is equal to the ratio of the opening section or sections and the light-shielding section when the opening sections of sub-pixel 61 are sliced out along the Y-axis direction at the certain point on the X axis. Therefore, in order to solve the problem about moiré patterns, it is desirable to make the ratio of the opening section or sections and the light-shielding section constant regardless of positions ranging along the X-axis direction. In the display apparatus relating to the present embodiment, the total sum of heights in the Y-axis direction of opening sections of sub-pixel 61 is constant regardless of positions on the X axis as shown by the expression (4). Thereby, moiré patterns can be substantially restricted.

The 3D crosstalk means the ratio of the quantity of light coming from a neighboring sub-pixel and mingling with light from a concerned sub-pixel at observer's eyes. The ratio having a greater value means that an image for the right eye and an image for the left eye reaches the observer's right and left eyes with much more mingling together, which makes the observer difficult to perceive a three-dimensional image. The 3D crosstalk is caused because opening sections of neighboring sub-pixels exist together on a straight line being parallel with the Y axis, and the 3D crosstalk becomes greater as the area where the opening sections exist together on the straight line becomes longer in the X-axis direction. The area in the present embodiment has length "W". Further, in an area in size of lens spot width "Wg", light which has been emitted from an opening section and has width "Wg" along the X-axis direction is averaged with a lens. Therefore, when the width Wg becomes greater, the amount of the 3D crosstalk also becomes greater. However, each of "W" and "Wg" is set at one third the value of Ppx or less in the present embodiment, and the value of the 3D crosstalk can be controlled to be low. Such the control of the 3D crosstalk to be low is quite important for a three-dimensional image display apparatus of two-viewpoint type and multiple-viewpoint type using parallax images.

Next, a cause of generation of the sense of horizontal stripes and a reason why the sense of horizontal stripes can be solved in the display apparatus of the present embodiment will be described. The inventor made plural liquid crystal display apparatuses for which countermeasures against moiré patterns were taken, with changing their layouts of opening sections, and investigated the sense of horizontal stripes given by the liquid crystal display apparatuses. As the result, the inventor found that the sense of horizontal stripes greatly depends on the fluctuation range $\Delta$Cgsma(X) of moving average values Cgsma(X) of positions of the center of gravity of opening sections. Table 1 shows the evaluation result of the sense of horizontal stripes. In the evaluation, four samples were evaluated. In each sample, the layout of opening sections is changed in values of $\Delta$Cg and $\Delta$Cgsma from other samples. In all the samples of the evaluation, pitch Ppx of the sub-pixels in the X-axis direction and pitch Ppy of the sub-pixels in the Y-axis direction were set at 91.5 μm and 61 μm, respectively, and the lens spot width "Wg" was set at 18 μm. The evaluation was conducted as a subjective evaluation, a sample in which the sense of horizontal stripes was perceived was evaluated as "Perceived", and a sample on which the sense of horizontal stripes was not perceived was evaluated as "Not Perceived".

As can be seen from the result of Table 1, the sense of horizontal stripes depends on the values of $\Delta$Cgsma rather than the values of $\Delta$Cg, and the sense of horizontal stripes was not perceived at all in Sample C whose value of $\Delta$Cgsma was 2.8 μm. Though it is expected that the evaluation varies between evaluators because of difference in eyesight between evaluators in such a subjective evaluation, there was provided the evaluation result regarding Sample C that no observer perceived the sense of horizontal stripes. Sample D was prepared by putting lenses on a general LCD (Liquid Crystal Display) apparatus which can display two-dimensional images, wherein each of the values of $\Delta$Cg and $\Delta$Cgsma was zero. In this sample, the sense of horizontal stripes was not perceived at all. This result shows that the sense of horizontal stripes is a problem specific to display apparatuses, in which countermeasures against moiré patterns were taken, for displaying three-dimensional images.

TABLE 1

| Samples | $\Delta$Cg | $\Delta$Cgsma | Sense of Horizontal Stripes |
|---------|------------|---------------|-----------------------------|
| A | 20 μm | 20 μm | Perceived |
| B | 11 μm | 11 μm | Perceived |
| C | 11 μm | 2.8 μm | Not Perceived |
| D | 0 μm | 0 μm | Not Perceived |

As a result of the inventor's continued studies about the reason why the above evaluation result was obtained, the following cause of generation of the sense of horizontal stripes has been found.

Figure 9:
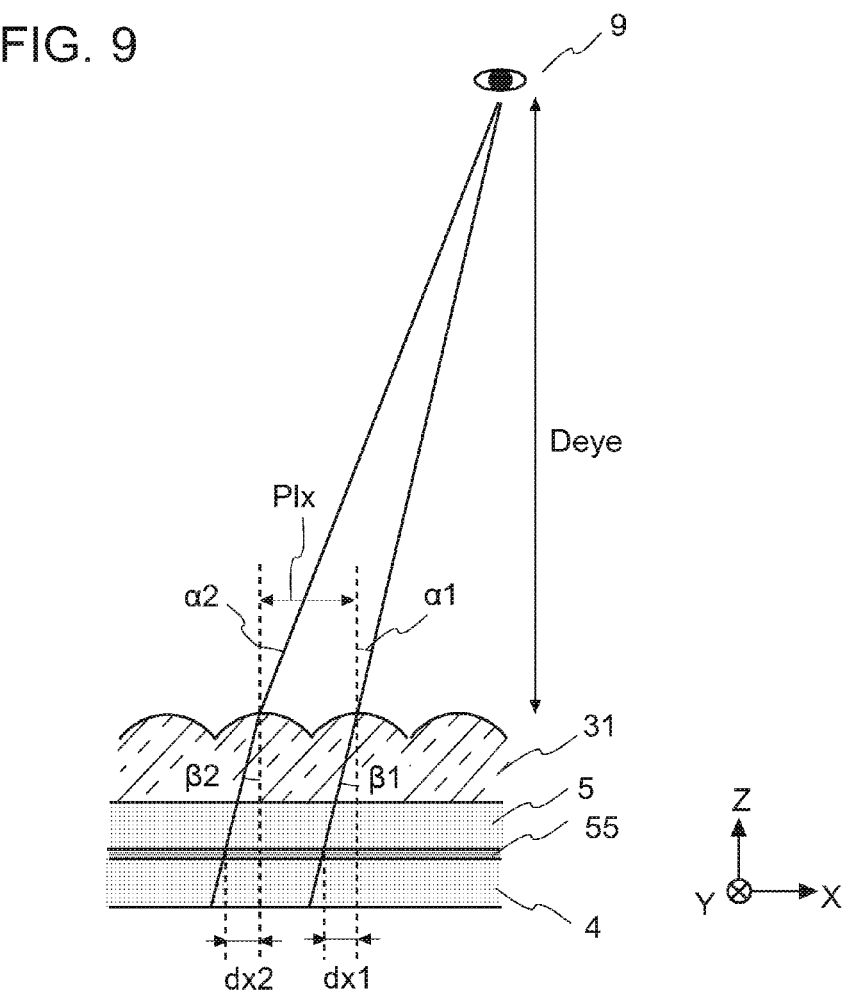
FIG. 9 is a diagram schematically illustrating optical paths of light emitted from the sub-pixels of the display apparatus relating to the embodiment of the present invention.

The sense of horizontal stripes has a characteristic that an observer strongly perceives the sense of horizontal stripes especially when going to observe details in a narrow area on a display apparatus. FIG. 9 illustrates light emitted from the display apparatus under the above situation and reaching observer's eye 9. Pitch Plx of cylindrical lenses 31 in the X-axis direction is almost the same as the pitch of pixels in the X-axis direction (2×Ppx in this case) and has a quite small value in comparison with the value of distance Deye between the observer's eye and the display apparatus. Therefore, assuming that lines which are drawn between the tops of neighboring cylindrical lenses 31 and the observer's eye form angles $\alpha$1 and $\alpha$2 with the normal lines of the display apparatus, respectively, the angles $\beta$2 and $\beta$2 are almost the same as each other. Herein, according to the Snell's law, the relationship between angles $\alpha$1 and $\beta$1 and the relationship between angles $\alpha$2 and $\beta$2 hold as represented by the following expression (8), where "n0" is the refractive index of the air and "n1" is the refractive index of the lenses. Therefore, if the values of $\alpha$1 and $\alpha$2 are almost the same as each other, also the values of $\beta$1 and $\beta$2 are almost the same as each other. Under the situation, from a geometric viewpoint, the values of dx1 and dx2 are almost the same as each other. It shows that, under the assumption that the cylindrical lenses 31 have no aberrations and their focal lengths are set around liquid crystal layer 55, light beams coming from the neighboring pixels and reaching observer's eye 9 start at the same positions in those pixels.

$$n0 \times \sin \alpha = n1 \times \sin \beta \tag{8}$$

However, because of the manufacturing tolerance and various kinds of aberration of a cylindrical lens, light is not completely converged at the focal point through a cylindrical lens and has a spread of a certain degree at the focal point. The light within the range of the spread is averaged and an observer perceives the intensity of the averaged light. In the present embodiment, the width of the spread of converged light on the liquid crystal layer is defined as "Wg". When an observer views the display apparatus, the observer perceives light beams which have been emitted from the opening sections of the display apparatus wherein light beams in the range of Wg extending in the X-axis direction are averaged.

Figure 10:
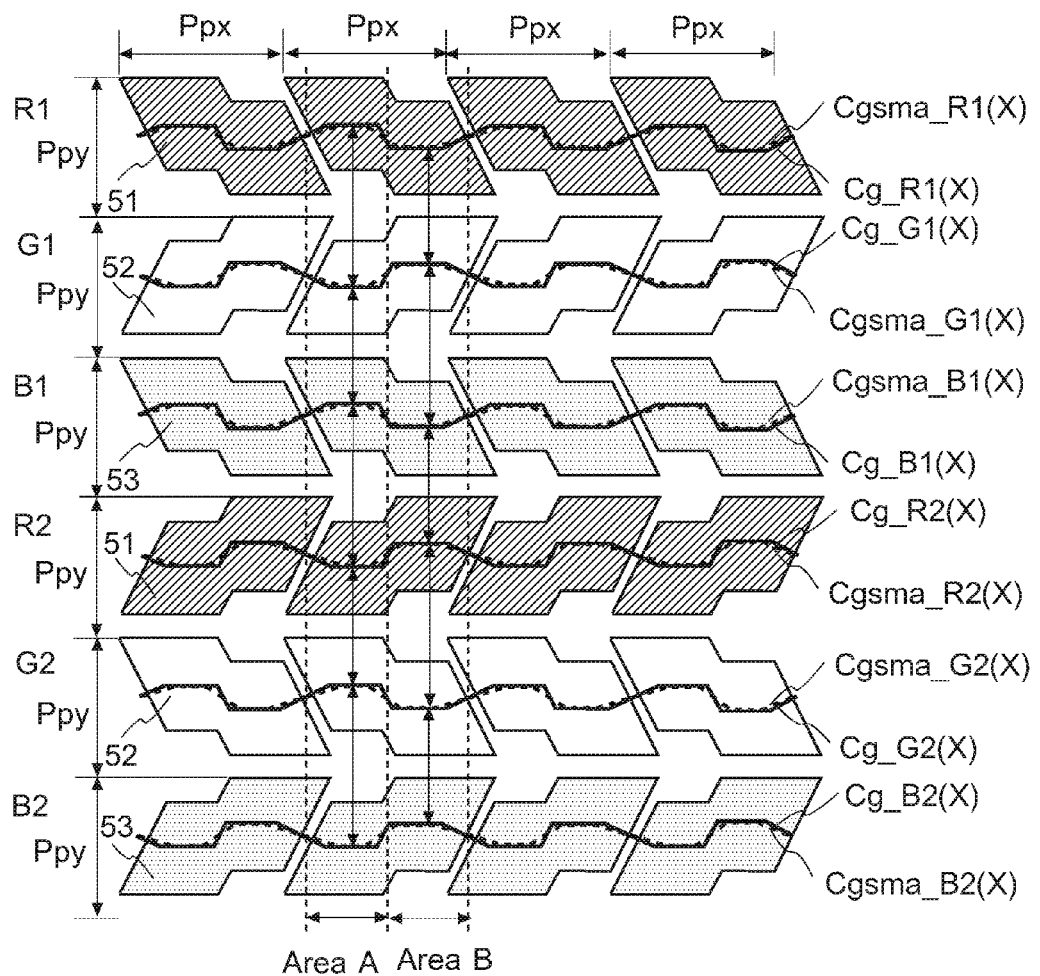
FIG. 10 is a diagram illustrating a layout of opening sections of a conventional liquid crystal display apparatus, used for an evaluation of a sense of horizontal stripes.
Figure 11:
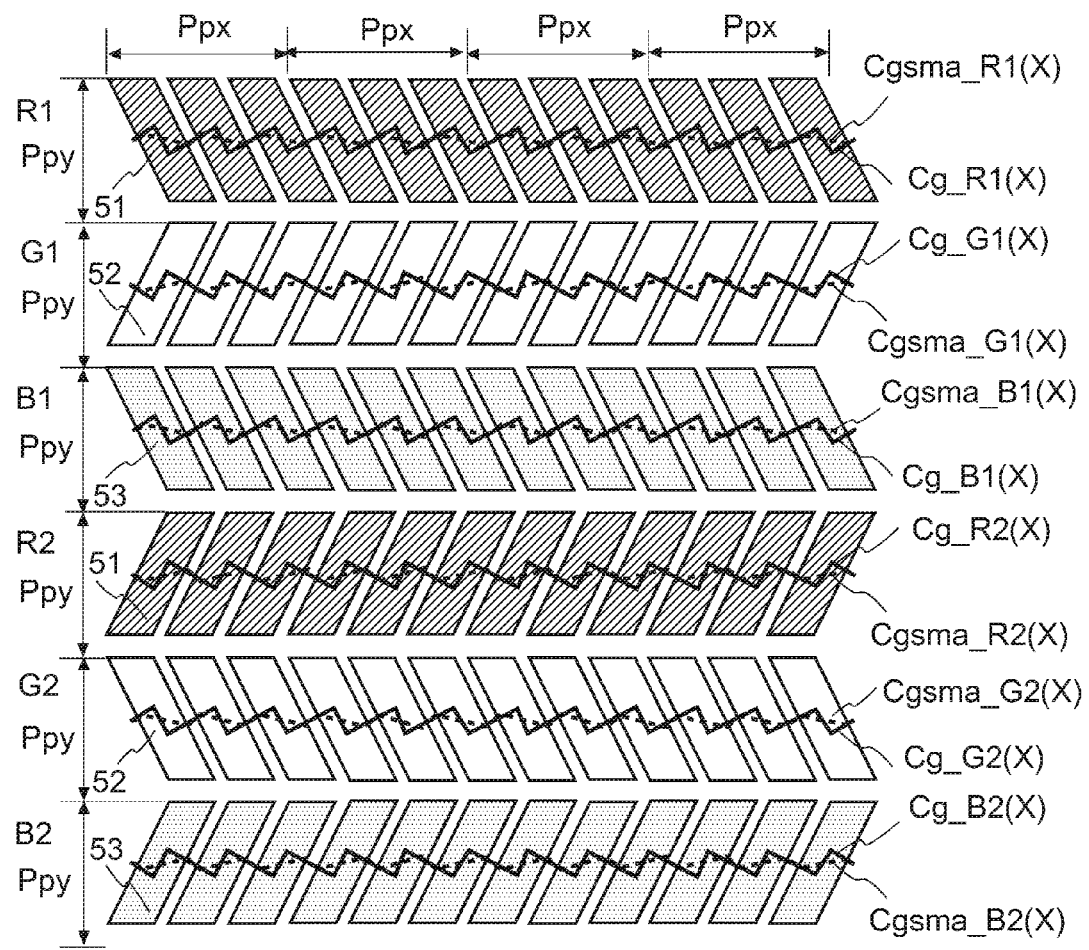
FIG. 11 is a diagram illustrating a layout of opening sections of a liquid crystal display apparatus relating to the embodiment of the present invention, used for an evaluation of a sense of horizontal stripes.

FIGS. 10 and 11 illustrate the layout of opening sections of Sample B and that of Sample C which are used for the evaluation of the sense of horizontal stripes shown in Table 1. Each of FIGS. 10 and 11 illustrates 4×6 sub-pixels arranged in a matrix extending in the X-axis direction and the Y-axis direction. In FIGS. 10 and 11, color resists for transmitting the same-colored light are put on each row of sub-pixels arranged in the X-axis direction, and R-resists for red light, G-resists for green light and B-resists for blue light are arranged for respective rows repeatedly in this order from the upper side of the rows. In FIGS. 10 and 11, positions of the center of gravity of opening sections of each row of the sub-pixels (for example, values of Cg_R1(X)) are represented by a solid line and moving average values of the positions of the center of gravity of the opening sections of each row of the sub-pixels (for example, values of Cgsma_R1(X)) are represented by a broken line. The fluctuation range ΔCg of the positions of the center of gravity of opening sections of Sample B shown in FIG. 10 and that of Sample C shown FIG. 11 are the same as each other but the fluctuation range ΔCgsma of the moving average values of the positions of the center of gravity of opening sections of Sample B is different from that of Sample C, that is, the fluctuation range ΔCgsma of Sample C is smaller than the other, as shown in Table 1. Further, Sample A has a structure that recess parts of each sub-pixel of FIG. 10 are enlarged, and Sample D has a structure that each of opening sections of sub-pixels is formed into a rectangular shape, which are not illustrated.

Further details of descriptions of the samples will be given below. In Sample B, the moving average values of positions of the center of gravity of opening sections of each of the rows of sub-pixels R1, G1, B1, R2, G2 and B2 show the following characteristics. In Area A, the distance of line segments of two kinds of moving average Cgsma_R1(X) and Cgsma_G1(X) of positions of the center of gravity of opening sections is relatively greater and the distance of line segments of two kinds of moving average Cgsma_G1(X) and Cgsma_B1(X) is relatively smaller. On the other hand, the distance of line segments of two kinds of moving average Cgsma_R2(X) and Cgsma_G2(X) is relatively smaller and the distance of line segments of two kinds of moving average Cgsma_G2(X) and Cgsma_B2(X) is relatively greater. In contrast, in Area B, the distance of line segments of two kinds of moving average Cgsma_R1(X) and Cgsma_G1(X) is relatively smaller and the distance of line segments of two kinds of moving average Cgsma_G1(X) and Cgsma_B1(X) is relatively greater. On the other hand, the distance of line segments of two kinds of moving average Cgsma_R2(X) and Cgsma_G2(X) is relatively greater and the distance of line segments of two kinds of moving average Cgsma_G2(X) and Cgsma_B2(X) is relatively smaller. As for Sample C, since the moving average of positions of the center of gravity of opening sections does not fluctuate so greatly in each row of sub-pixels, the distance of lines representing two kinds of moving average values of positions of the center of gravity of opening sections of rows neighboring in the Y-axis direction, becomes almost constant.

As described above, when an observer is going to observe details in a narrow area on a display apparatus, the intensity of light reaching the observer's eye depends on moving average values of positions of the center of gravity of opening sections at a certain position in a sub-pixel. Further, an observer perceives color of light by spatially mixing light beams emitted from sub-pixels for R, G and B colors. If positions with regard to the intensity of light beams emitted from respective kinds of sub-pixels for R, G and B colors are displaced in the Y-axis direction, the perceived color changed depends of the displacement. In other words, as shown in Sample B, when the distance of two kinds of moving average values of positions of the center of gravity of opening sections among sub-pixels for R, G and B colors varies depending on positions ranging in the X-axis direction in the sub-pixels, where the center of gravity of opening sections is equivalent to the center, which is taken in the Y-axis direction, of intensity distribution of light coming from the sub-pixels, the color perceived by an observer also varies corresponding to the variation of the distance. Since the distance is different between two neighboring pixels arranged in the Y-axis direction (a pixel composed of sub-pixels in rows R1, G1 and B1 and a pixel composed of sub-pixels in rows R2, G2 and B2), the observer perceives different colors when viewing light coming from two neighboring pixel rows, which causes the sense of horizontal stripes.

On the other hand, in Sample C, since the moving average values of positions of the center of gravity of opening sections of each row of sub-pixels do not fluctuate substantially, which naturally makes the distance of lines representing two kinds of moving average almost the same, where the two kinds of moving average are moving average values of positions of the center of gravity of opening sections of a row of sub-pixels and those of opening sections of another row of sub-pixels neighboring in the Y-axis direction. Accordingly, even when an observer perceives color by spatially mixing light beams emitted from sub-pixels for R, G and B colors, the observer does not perceive different colors on viewing the two kinds of light beams coming from the rows of pixels neighboring in the Y-axis direction. However, in the case that viewing a single color rather than mixing colors is considered, the center positions, taken in the Y-axis direction, of the intensity distributions of light emitted from pixel rows neighboring in the Y-axis direction are different from each other, therefore, the light beams emitted from the pixel rows are not observed uniformly in the Y-axis direction, which is felt by an observer as the sense of horizontal stripes. As can be seen from the experiment result shown in Table 1, it is clear that the threshold value of moving average values of positions of the center of gravity of opening sections, which do not make an observer perceive the sense of horizontal stripes, is within the range from 2.8 µm to 11 µm. From a viewpoint that variations of pixels in shape coming from manufacturing variations of the evaluation samples was about 2 µm, it is found that the sense of horizontal stripes can be restricted by designing the fluctuation range of the movement average value to be equal to or less than about 5 µm.

As described above, the sense of horizontal stripes may be restricted by reducing the fluctuation range of the moving average values of positions of the center of gravity of opening sections of each row of sub-pixels. Therefore, the sense of horizontal stripes can be restricted in the display apparatus relating to the present embodiment.

EXAMPLES

Example 1

Hereinafter, there will be provided an example about the display apparatus of the present embodiment realized by using a liquid crystal display apparatus, and the present example illustrates a concrete layout of sub-pixels of the liquid crystal display apparatus. For the construction and the way to drive the display apparatus of the present example, a similar construction and a similar way to drive of the display apparatus of the present embodiment can be employed.

Figure 12:
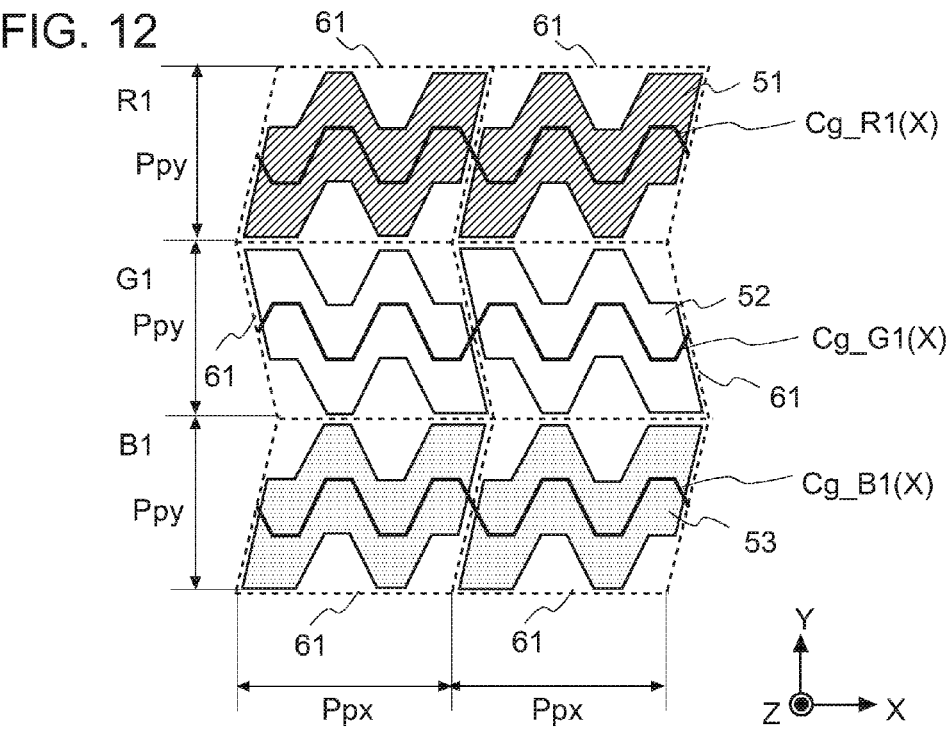
FIG. 12 is a diagram illustrating a layout of opening sections of a display apparatus relating to Example 1 of the present invention.

FIG. 12 illustrates the layout of opening sections of one pixel of the liquid crystal display apparatus of Example 1. One pixel is composed of six sub-pixels 61 having pitch Ppx in the X-axis direction and pitch Ppy in the Y-axis direction. There are arranged color resists in the same color on each of rows of sub-pixels arrayed in the X-axis direction. In the example shown in FIG. 12, R-resists 51, G-resists 52 and B-resists 53 are put on rows R1, G1 and B1 of sub-pixels, respectively. In FIG. 12, Cg_R1(X) is a line representing positions of the center of gravity of opening sections of row R1 of sub-pixels, Cg_G1(X) is a line representing positions of the center of gravity of opening sections of row G1 of sub-pixels, and Cg_B1(X) is a line representing positions of the center of gravity of opening sections of row B1 of sub-pixels.

Figure 13:
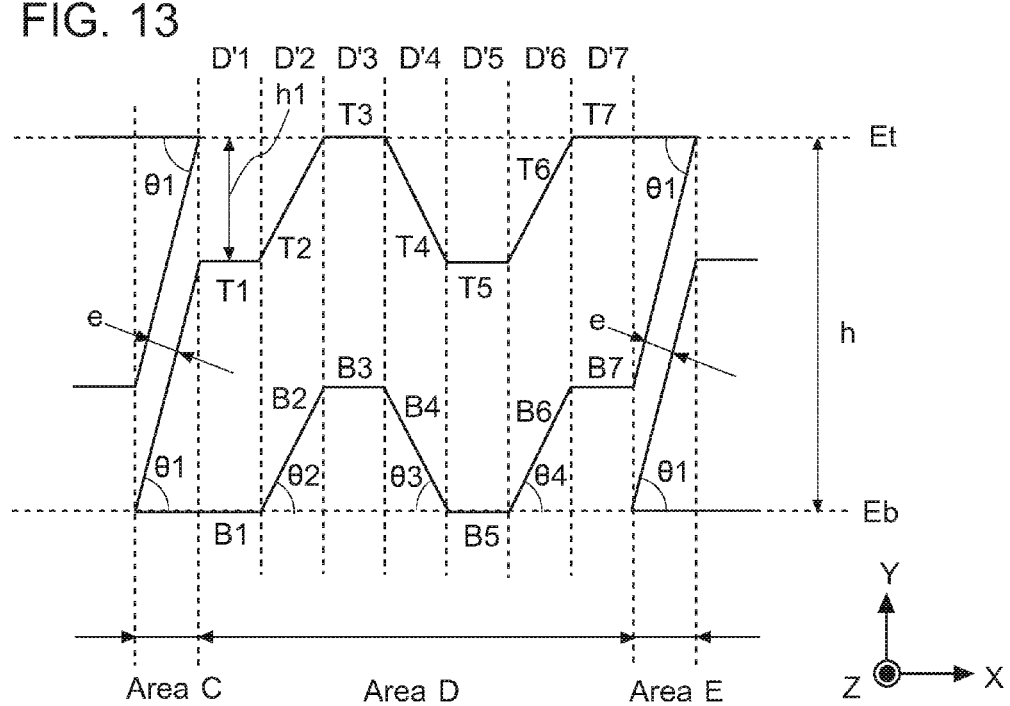
FIG. 13 is a diagram illustrating a layout of an opening section of a sub-pixel of the display apparatus relating to Example 1 of the present invention.

FIG. 13 illustrates sub-pixel 61 of Example 1 shown in FIG. 12 in details. Features of the sub-pixel 61 of Example 1 will be described below by using three areas of Area C, Area D and Area E prepared by dividing sub-pixel 61. In Area C, sub-pixel 61 is in contact with another sub-pixel neighboring to the sub-pixel 61 in the X-axis direction, through a light-shielding section as the boundary of the neighboring sub-pixels. The light-shielding has width "e" and inclines at angle θ1 against the X axis in Area C. Therefore, the length in the Y-axis direction of the light-shielding section is given by the following expression (9).

$$e/\cos \theta 1 \qquad (9)$$

Similarly in Area E, sub-pixel 61 is in contact with another sub-pixel neighboring to the sub-pixel 61 in the X-axis direction, through a light-shielding section as the boundary of the neighboring sub-pixels. The light-shielding has width "e" and inclines at angle θ1 against the X axis in Area E. Therefore, the length in the Y-axis direction of the light-shielding section is also given by the expression (9).

In Area D, the upper side in the Y-axis direction of the opening section of sub-pixel 61 is defined by line segments T1, T2, T3, T4, T5 T6 and T7, and the lower side in the Y-axis direction of the opening section is defined by line segments B1, B2, B3, B4, B5, B6 and B7. Herein, the line segments T1 and B1 are parallel with each other. Line segments T2 and B2, line segments T3 and B3, line segments T4 and B4, line segments T5 and B5, line segments T6 and B6, and line segments T7 and B7 are parallel with one another, too. If the value of h1 shown in FIG. 13 is set at the same value as the value given by the expression (9) in this structure, the length in the Y-axis direction of the opening section of the sub-pixel has the value given by the following expression (10) equally in all the areas, from a viewpoint of a geometric relationship.

$$h - e/\cos \theta 1 \qquad (10)$$

In this expression, h denotes the length of the area shown in FIG. 13. Angles θ1, θ2, θ3 and θ4 shown in FIG. 13 are not necessarily equal to each other.

Next, calculation of the center of gravity of the opening section will be described. Each of the center of gravity of opening sections Cg_R1(X), Cg_G1(X) and Cg_B1(X) illustrated in FIG. 12 was calculated by the expression (5) or the expression (6) given in the above descriptions about the present embodiment. As can be seen from FIG. 12, positions of the center of gravity of opening sections fluctuate upward twice and downward twice in the Y-axis direction in one sub-pixel 61. Among the periods of the fluctuation, the longest period is set at a value close to spot width Wg of the cylindrical lenses measured on the liquid crystal layer. If the period is much greater than the spot width Wg, increasing values of θ2 through θ4 can increase the frequency of fluctuations upward and downward in the Y-axis direction of the positions of the center of gravity of the opening section, which results in decrease of the above-described period. In other words, increasing the angles means increasing the number of areas D'1 to D'7 as parts prepared by dividing Area D. At that time, the number of divided parts should be adjusted in order to keep the conformity in shape with sub-pixels neighboring at the right side and the left side in the X-axis direction.

According to the present example, a generation of moiré patterns can be restricted and the sense of horizontal stripes can be reduced because of the following reasons, similarly to those which have been described for the present embodiment.

First, the length of the opening section in the Y-axis direction is constant regardless of positions ranging in the X-axis directions, which restricts the moiré patterns. Second, the period of vertical fluctuations in the Y-axis direction of positions of the center of gravities of the opening section is set at a value close to spot width Wg of the cylindrical lenses, which reduces the fluctuation in the Y-axis direction of the moving average values, calculated with averaging range Wg, of positions of the center of gravity of opening sections.

Further, the construction of the present example can increase the opening ratio of the sub-pixels. As shown in FIG. 3, each sub-pixel is composed of at least TFT 64, liquid crystal capacitance 65 and storage capacitance 66. In order to layout TFTs 64 properly, a space extending by certain lengths in both of the X-axis direction and the Y-axis direction is required in the XY coordinate system. In the layout of sub-pixels shown in FIG. 5, an opening section is divided along lines extending in the Y-axis direction, and the widths of light-shielding sections used for dividing the opening section are narrow. Therefore, it was difficult to put TFTs 64 on the light-shielding sections around this area, and it was required to put the TFTs 64 in other areas, which resulted in deterioration of the opening ratio. On the other hand, in the present example, as shown in FIG. 12, there are light-shielding sections extending by certain length in the X-axis direction and the Y-axis direction in the XY plane, and TFTs 64 can be put on the light-shielding sections, which can increase the opening ratio.

Example 2

Hereinafter, there will be provided an example about the display apparatus of the present embodiment realized by using a liquid crystal display apparatus, and the present example illustrates a concrete layout of sub-pixels of the liquid crystal display apparatus. For the construction and the way to drive the display apparatus of the present example, a similar construction and a similar way to drive of the display apparatus of the present embodiment can be employed.

Figure 14:
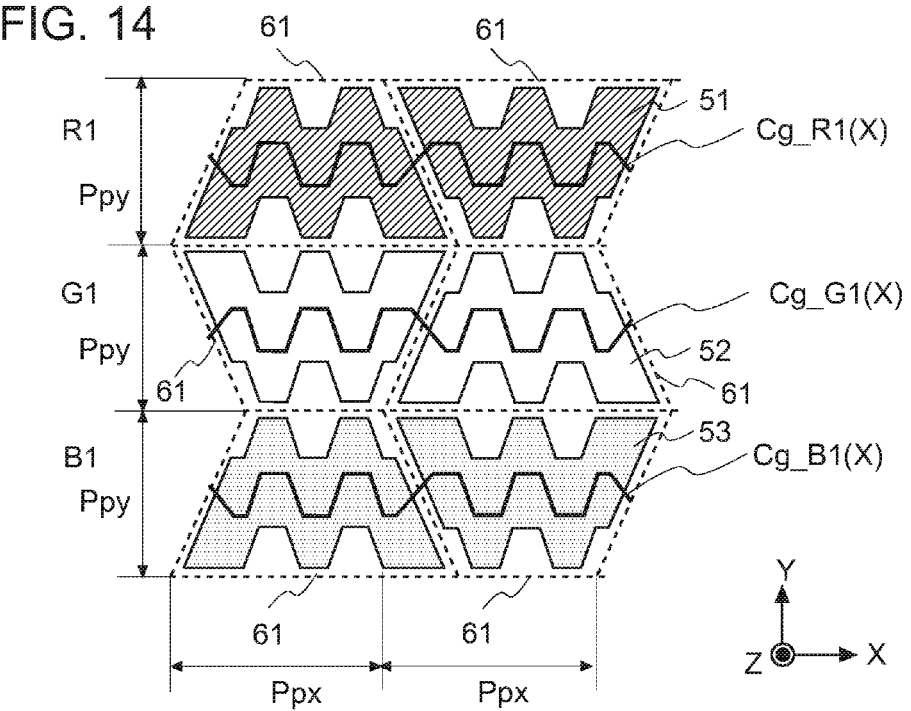
FIG. 14 is a diagram illustrating a layout of opening sections of a display apparatus relating to Example 2 of the present invention.

FIG. 14 illustrates the layout of opening sections of one pixel of the liquid crystal display apparatus of Example 2. One pixel is composed of six sub-pixels 61 having pitch Ppx in the X-axis direction and pitch Ppy in the Y-axis direction. There are arranged color resists in the same color on each of rows of sub-pixels arrayed in the X-axis direction. In the example shown in FIG. 14, R-resists 51, G-resists 52 and B-resists 53 are put on rows R1, G1 and B1 of sub-pixels, respectively. In FIG. 14, Cg_R1(X) is a line representing positions of the center of gravity of opening sections of row R1 of sub-pixels, Cg_G1(X) is a line representing positions of the center of gravity of opening sections of row G1 of sub-pixels, and Cg_B1(X) is a line representing positions of the center of gravity of opening sections of row B1 of sub-pixels.

Figure 15:
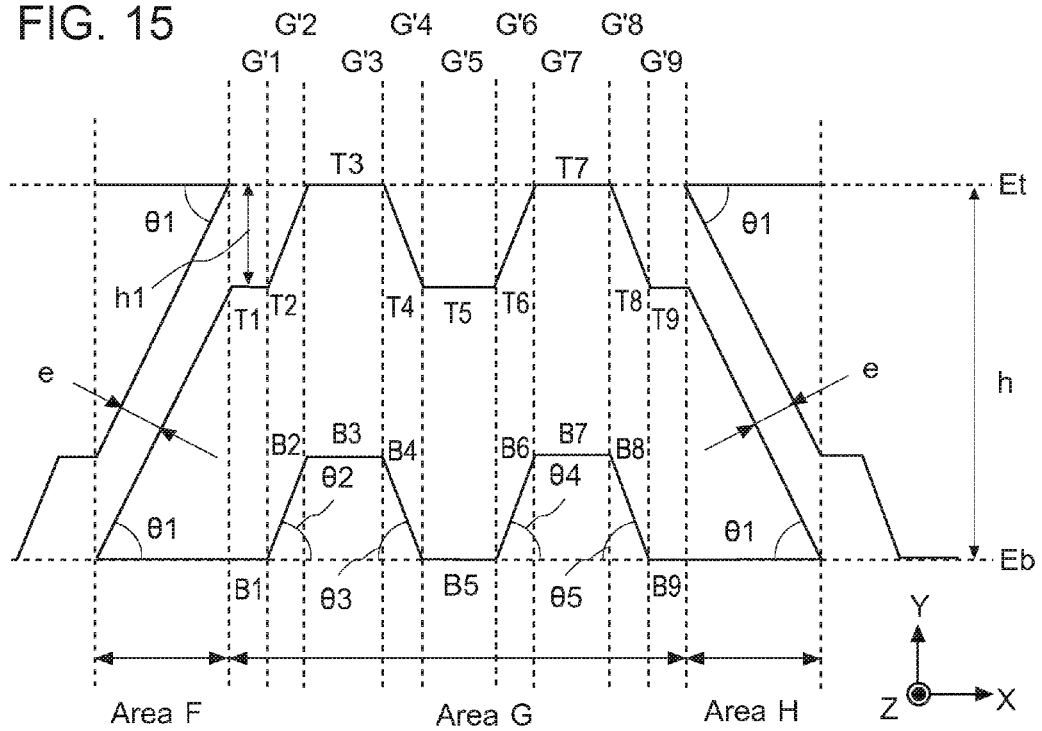
FIG. 15 is a diagram illustrating a layout of an opening section of a sub-pixel of the display apparatus relating to Example 2 of the present invention.

FIG. 15 illustrates sub-pixel 61 of Example 2 shown in FIG. 14 in details. Features of the sub-pixel 61 of Example 2 will be described below by using three areas of Area F, Area G and Area H prepared by dividing the sub-pixel 61. In Area F, sub-pixel 61 is in contact with another sub-pixel neighboring to the sub-pixel 61 in the X-axis direction, through a light-shielding section as the boundary of the neighboring sub-pixels. The light-shielding has width "e" and inclines at angle θ1 against the X axis in Area F. Therefore, the length in the Y-axis direction of the light-shielding section is given by the above expression (9).

Similarly in Area H, sub-pixel 61 is in contact with another sub-pixel neighboring to the sub-pixel 61 in the X-axis direction, through a light-shielding section as the boundary of the neighboring sub-pixels. The light-shielding has width "e" and inclines at angle θ1 against the X axis in Area H. Therefore, the length in the Y-axis direction of the light-shielding section is also given by the expression (9).

In Area G, the upper side in the Y-axis direction of the opening section of sub-pixel 61 is defined by line segments T1, T2, T3, T4, T5, T6, T7, T8 and T9, and the lower side in the Y-axis direction of the opening section is defined by line segments B1, B2, B3, B4, B5, B6, B7, B8 and B9. Herein, the line segments T1 and B1 are parallel with each other. Line segments T2 and B2, line segments T3 and B3, line segments T4 and B4, line segments T5 and B5, line segments T6 and B6, line segments T7 and B7, line segments T8 and B8, and line segments T9 and B9 are parallel with one another, too. If the value of h1 shown in FIG. 15 is set at the same value as the value given by the expression (9) in this structure, the length in the Y-axis direction of the opening section of the sub-pixel has the value given by the above expression (10) equally in all the areas, from a viewpoint of a geometric relationship.

In this expression, h denotes the length of the area shown in FIG. 15. Angles θ1, θ2, θ3, θ4 and θ5 shown in FIG. 15 are not necessarily equal to each other.

Next, calculation of the center of gravity of the opening section will be described. Each of the center of gravity of opening sections Cg_R1(X), Cg_G1(X) and Cg_B1(X) illustrated in FIG. 14 was calculated by the expression (5) or the expression (6) given in the above descriptions about the present embodiment. As can be seen from FIG. 15, positions of the center of gravity of opening sections fluctuate upward twice or three times and downward twice or three times in the Y-axis direction in one sub-pixel 61. Among the periods of the fluctuation, the longest period is set at a value close to spot width Wg of the cylindrical lenses measured on the liquid crystal layer. If the period is much greater than the spot width Wg, increasing values of θ2 through θ5 can increase the frequency of fluctuations upward and downward in the Y-axis direction of the positions of the center of gravity of the opening section, which results in decrease of the above-described period. In other words, increasing the angles means increasing the number of areas G'1 to G'9 as parts prepared by dividing Area G. At that time, the number of divided parts should be adjusted in order to keep the conformity in shape with sub-pixels neighboring at the right side and the left side in the X-axis direction.

According to the present example, a generation of moiré patterns can be restricted and the sense of horizontal stripes can be reduced because of the following reasons, similarly to those which have been described for the present embodiment. First, the length of the opening section in the Y-axis direction is constant regardless of positions ranging in the X-axis directions, which restricts the moiré patterns. Second, the period of vertical fluctuations in the Y-axis direction of positions of the center of gravities of the opening section is set at a value close to spot width Wg of the cylindrical lenses, which reduces the fluctuation in the Y-axis direction of the moving average values, calculated with averaging range of Wg, of positions of the center of gravity of opening sections.

Further, the construction of the present example can increase the opening ratio of the sub-pixels. In the present example, as shown in FIG. 14, there are light-shielding sections extending by certain lengths in the X-axis direction and the Y-axis direction in the XY plane. TFTs 64 can be put on the light-shielding sections, which can increase the opening ratio. Accordingly, the opening ratio can be increased because of the similar reason described for Example 1.

Example 3

Hereinafter, there will be provided an example about the display apparatus of the present embodiment realized by using a liquid crystal display apparatus, and the present example illustrates a concrete layout of sub-pixels of the liquid crystal display apparatus. For the construction and the way to drive the display apparatus of the present example, a similar construction and a similar way to drive of the display apparatus of the present embodiment can be employed.

Figure 16:
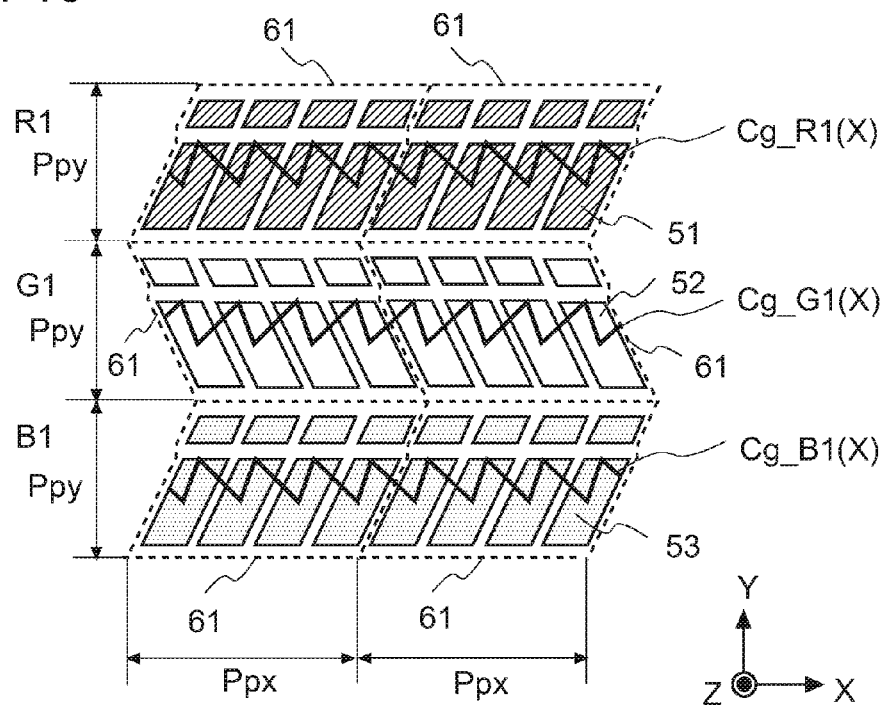
FIG. 16 is a diagram illustrating a layout of opening sections of a display apparatus relating to Example 3 of the present invention.

FIG. 16 illustrates the layout of opening sections of one pixel of the liquid crystal display apparatus of Example 3. One pixel is composed of six sub-pixels 61 having pitch Ppx in the X-axis direction and pitch Ppy in the Y-axis direction. There are arranged color resists in the same color on each of rows of sub-pixels arrayed in the X-axis direction. In the example shown in FIG. 16, R-resists 51, G-resists 52 and B-resists 53 are put on rows R1, G1 and B1 of sub-pixels, respectively. In FIG. 16, Cg_R1(X) is a line representing positions of the center of gravity of opening sections of row R1 of sub-pixels, Cg_G1(X) is a line representing positions of the center of gravity of opening sections of row G1 of sub-pixels, and Cg_B1(X) is a line representing positions of the center of gravity of opening sections of row B1 of sub-pixels.

Figure 17:
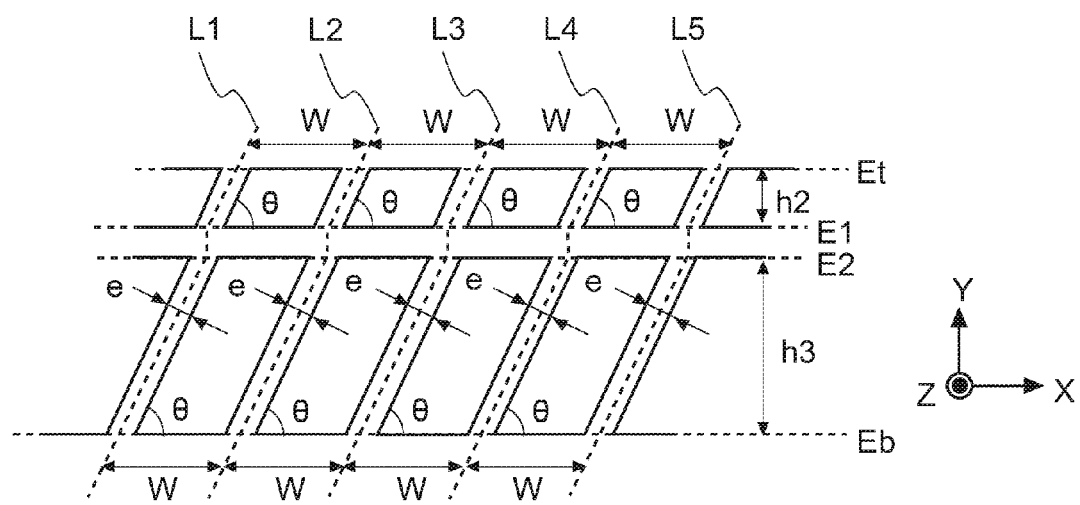
FIG. 17 is a diagram illustrating a layout of opening sections of a sub-pixel of the display apparatus relating to Example 3 of the present invention.

FIG. 17 illustrates sub-pixel 61 of Example 3 shown in FIG. 16 in details. Sub-pixels 61 of Example 3 have opening sections in a shape that each of the opening sections illustrated in the descriptions about the present embodiment is divided into two parts in the Y-axis direction. The opening sections of the sub-pixels are divided in the X-axis direction with light-shielding sections and all the light-shielding sections have width "e" and incline at angle θ against the X axis. The light-shielding sections dividing the opening sections of the sub-pixels in the Y-axis direction are defined by the border lines E1 and E2 which are parallel with the X axis. Under the assumption that the light-shielding sections dividing the opening sections in the X-axis direction have the center lines L1 to L5, the opening sections are adjusted such that the coordinates of the X axis of positions where each center line meets line E1 and line E2 agree with each other. Further, the opening sections are adjusted such that the values of W, θ, Ppx, h1 and h2 keep the relationship represented by the following expressions (11) and (12).

$$h2+h3=W \times \tan\theta \quad (11)$$

$$Ppx=n \times W \quad (12)$$

In these expressions, h2 and h3 are the heights in the Y-axis direction of the opening sections shown in FIG. 17, and "n" is an integer being equivalent to or more than one. In the example of FIG. 17, the value of "n" is four. When these expressions hold, the total sum of the heights of the opening sections in the Y-axis direction at each of positions ranging in the X-axis direction has the constant value given by the following expression (13) regardless of the positions ranging in the X-axis direction, from a viewpoint of a geometric relationship.

$$h2+h3-e/\cos\theta \quad (13)$$

Next, calculation of the center of gravity of an opening section will be described.

Figure 18:
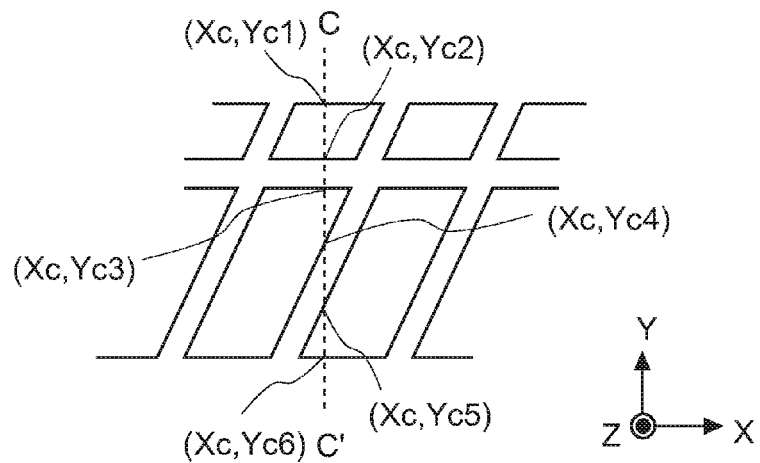
FIG. 18 is a diagram partially illustrating a layout of opening sections of a sub-pixel of the display apparatus relating to Example 3 of the present invention.

In the opening sections of the sub-pixels shown in FIG. 17, there is an area including three opening sections arranged in the Y-axis direction, as the area sliced along the line C-C' shown in FIG. 18. In this area, the position of the center of gravity of the opening sections can be calculated as follows by using the symbols shown in FIG. 18.

$$Cg(Xc) = \frac{(Yc2 - Yc1) \times (Yc1 + Yc2) + (Yc4 - Yc3) \times (Yc3 + Yc4) + (Yc6 - Yc5) \times (Yc5 + Yc6)}{2 \times (Yc2 - Yc1 + Yc4 - Yc3 + Yc6 - Yc5)} \quad (14)$$

Each of the center of gravity of opening sections Cg_R1(X), Cg_G1(X) and Cg_B1(X) illustrated in FIG. 16 was calculated by appropriately using the above expressions (14), (5) and (6). As can be seen from FIG. 16, positions of the center of gravity of the opening sections fluctuate upward four times and downward four times in the Y-axis direction in one sub-pixel 61. Among the periods of the fluctuation, the longest period is set at a value close to spot width Wg of the cylindrical lenses measured on the liquid crystal layer. If the period is much greater than the spot width Wg, the value of "n" in the expression (12) may be increased.

According to the present example, a generation of moiré patterns can be restricted and the sense of horizontal stripes can be reduced because of the following reasons, similarly to those which have been described for the present embodiment. First, the total length of the opening sections in the Y-axis direction is constant regardless positions ranging in the X-axis directions, which restricts the moiré patterns. Second, the period of vertical fluctuations in the Y-axis direction of the center of gravities of opening sections is set at a value close to spot width Wg of the cylindrical lenses, which reduces the fluctuation in the Y-axis direction of the moving average values, taken over the range of Wg, of positions of the center of gravity of opening sections.

Though the present example showed an example that each of the opening sections of the sub-pixels is divided in two pieces in the Y-axis direction, each of the opening sections may be divided in three or more pieces in the Y-axis direction. In this case, it is preferable that the light-shielding sections dividing the opening sections in the Y-axis direction are parallel with the X axis and have the same width in the Y-axis direction, and that the center lines of the light-shielding sections dividing the opening sections in the X-axis direction are parallel with the Y axis at the positions the opening sections are divided in the Y-axis direction. The way to calculate positions of the center of gravity in this case can be easily given based on the regularity of the expressions (6) and (14).

Further, the way to divide each opening section in the Y-axis direction is applicable to the layout of opening sections shown in Example 2 similarly. Also in this case, it is preferable that the light-shielding sections dividing the opening sections in the Y-axis direction are parallel with the X axis and have the same width in the Y-axis direction, and that the center lines of the light-shielding sections dividing the opening sections in the X-axis direction are parallel with the Y axis at the positions the opening sections are divided in the Y-axis direction.

While the embodiments and examples relating to the present invention have been described using specific terms, such description is for illustrative purpose only, and it is to be understood that changes and variations may be made without depending from the spirit or scope of the appended claims.

In the above embodiments and examples, there were given descriptions of examples employing a liquid crystal display apparatus as a way to realize a display apparatus being an embodiment of the present invention. However, such the display apparatus can be realized by employing an apparatus other than liquid crystal display apparatuses shown in the above-described examples. For example, an organic or inorganic EL (Electro Luminescence) display apparatus or a display apparatus using a PDP (Plasma Display Panel) may be provided as the display apparatus.

Figure 19:
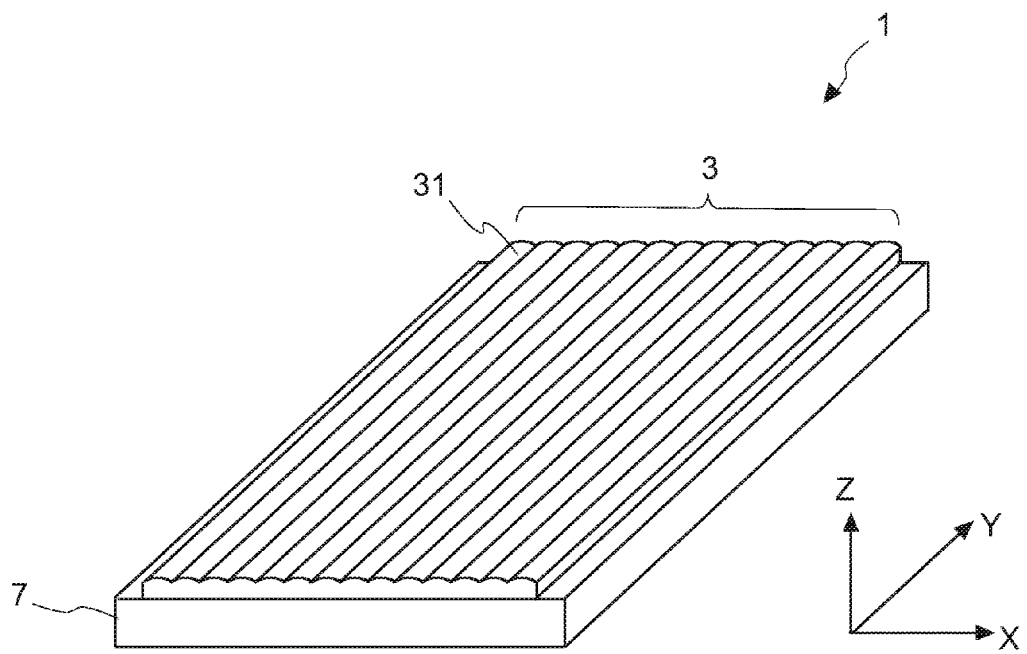
FIG. 19 is a perspective view illustrating a display apparatus equipped with an EL panel, relating to an embodiment of the present invention.
Figure 20:
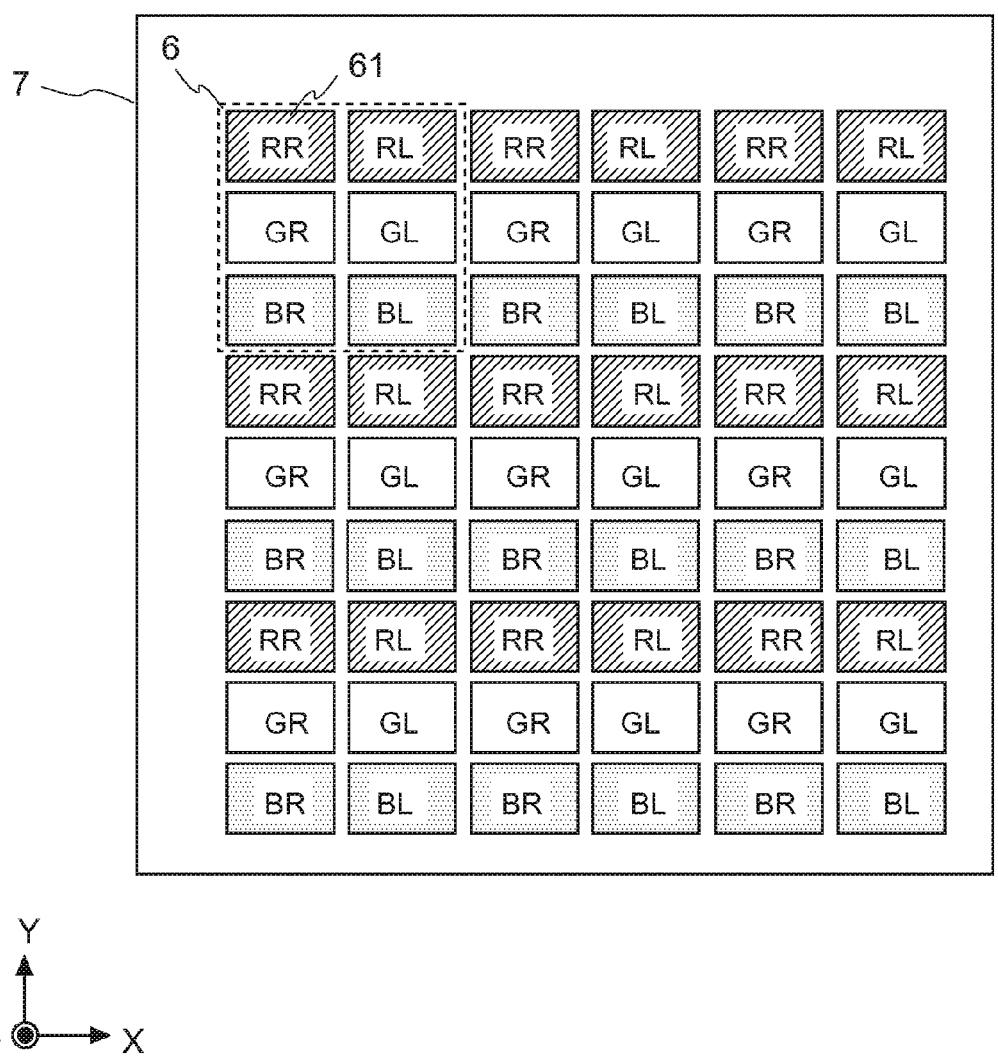
FIG. 20 is a diagram schematically illustrating a pixel arrangement of an EL panel of a display apparatus relating to an embodiment of the present invention.
Figure 21:
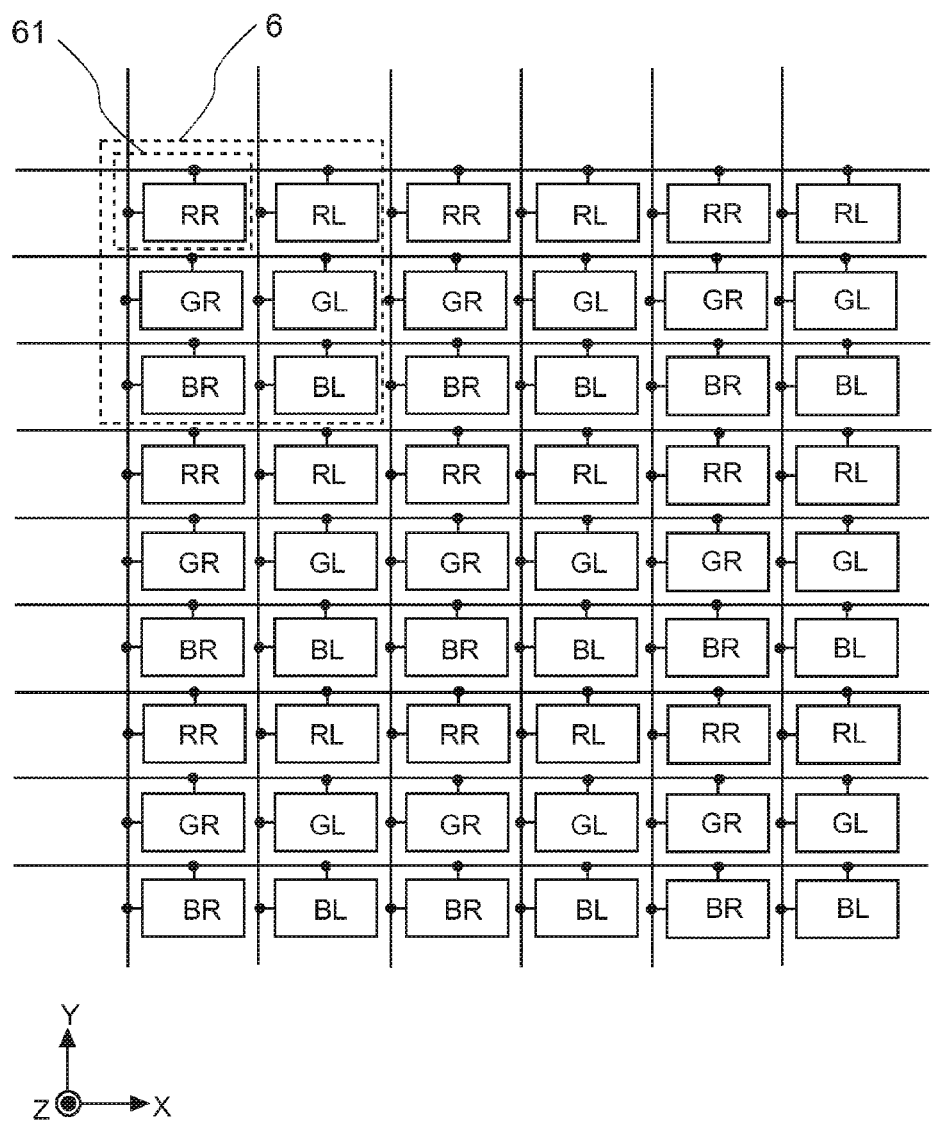
FIG. 21 is a schematic diagram illustrating a layout of pixels of a conventional liquid crystal display apparatus.
Figure 22:
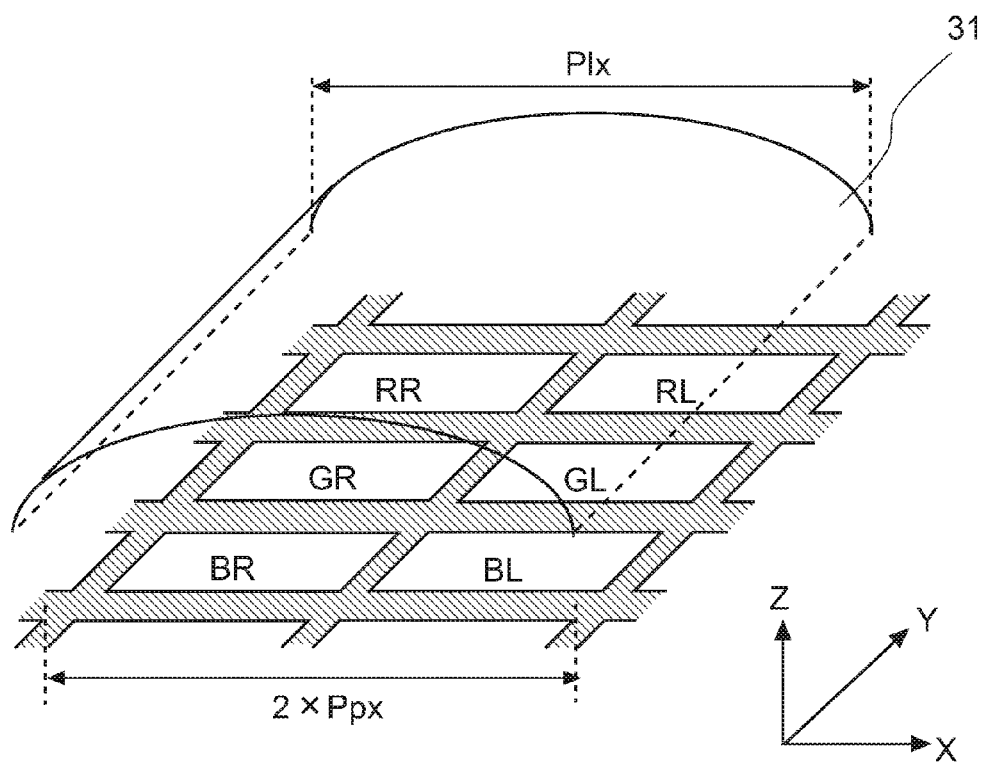
FIG. 22 is a perspective view partially illustrating a structure of a conventional liquid crystal display apparatus.

FIG. 19 illustrates a structural example of display apparatus 1 in the case that the display apparatus of the present embodiment is realized by using a display apparatus equipped with an EL panel. In FIG. 19, the symbol 7 represents an EL panel. FIG. 20 is a diagram schematically illustrating the pixel arrangement of EL panel 7. EL panel 7 includes 3×3 pixels 6 arrayed in the X-axis direction and the Y-axis direction. Each of the pixels is composed of six sub-pixels arrayed in a matrix. The six sub-pixels 61 forming one pixel 6 are arranged as sub-pixels RR, RL, GR, GL, BR and BL shown in FIG. 20. Sub-pixel RR is a sub-pixel for displaying a red image for the right eye and sub-pixel RL is a sub-pixel for displaying a red image for the left eye. Similarly, sub-pixels GR, GL, BR and BL are a sub-pixel for displaying a green image for the right eye, a sub-pixel for displaying a green image for the left eye, a sub-pixel for displaying a blue image for the right eye and a sub-pixel for displaying a blue image for the left eye. As can be seen from FIG. 20, a row of sub-pixels 61 arrayed in the X-axis direction display images of the same color and such the rows of sub-pixels displaying images of R, G and B colors are arranged in the Y-axis direction in this order of colors. For the layout of the light emitting section or light emitting sections of each sub-pixel, the layout shown in FIG. 4, 12 or 14 may be employed.

In this example, the light emitting sections are defined by intersections of cathodes and anodes of EL elements. The positions of the center of gravity of opening sections of liquid crystal display apparatuses shown in the above examples can be replaced with positions of the center of gravity of light emitting sections in this example, by using the similar definitions to those for the liquid crystal display apparatuses. The colors of emitted light can be defined by applying materials wherein three kinds of light having wavelengths corresponding to three primary colors of light are exited, onto the corresponding light emitting sections, or by applying a material emitting white light onto all the sub-pixels and putting color filters on the sub-pixels to separate light having desired spectrum from the light transmitting the sub-pixels. Any of the above ways may be employed as far as color of light emitted from one of the sub-pixels is same as color of light emitted from a row of sub-pixels neighboring in the X-axis direction, and is different from color of light emitted from neighboring sub-pixels in the Y-axis direction. It is important for the present example that the light emitting sections of the sub-pixels are adjusted so as to keep the fluctuation range in the Y-axis direction of the moving average values of positions of the center of gravity of the light emitting sections, to be equal to or less than a predetermined value. Herein, the moving average values are obtained by calculating positions of the center of gravity of light emitting section or sections of each sub-pixel (in other words, positions of the center of gravity, taken along the Y-axis direction, of the intention distribution of light emitted from the light emitting section) at plural positions ranging in the X-axis direction, and taking a moving average value, by using spot width Wg as the averaging range, at each of the positions ranging in the X-axis direction, where the spot width Wg is a width of converged light formed at the position of the light emitting surface when a parallel light flux enters the cylindrical lens along the normal direction.

In the above descriptions, examples of display apparatuses for displaying an image for the left eye and an image for the right eye at once were given. However, the above examples may be applied to a display apparatus for displaying two or more images at once, namely, a display apparatus for handing multiple viewpoints. Further, the above examples may be applied to display apparatus using colors other than red, green and blue, additionally to the illustrative display apparatuses using red, green and blue as three primary colors of light.

Further, decreasing the fluctuation range of the movement average values of positions of the center of gravity of opening sections or light emitting sections, can be represented also as making the period of the vertical fluctuation of positions of the center of gravity Cg(X) of opening sections (or light emitting sections) close to the spot width Wg of the cylindrical lenses, or equal to or less than the spot width Wg. As a way to achieve the above matters, the followings can be considered: a way to reduce the period of vertical fluctuation of positions of the center of gravity Cg (X) of opening sections (or light emitting sections) and a way to increase the spot width Wg. However, increasing the spot width Wg enlarges the degree of mixture of light emitted from sub-pixels neighboring in the X-axis direction, which increases the value of 3D crosstalk and makes the image quality deteriorate. Therefore, decreasing the period of vertical fluctuation of positions of the center of gravity Cg(X) of opening sections (or light emitting sections) is preferable.

The invention claimed is:

1. A liquid crystal display apparatus comprising:
a first substrate;
a second substrate;
a liquid crystal layer put between the first substrate and the second substrate;
an array of sub-pixels arrayed in a first direction and a second direction, the first direction and second direction being perpendicular to each other, each of the sub-pixels including an opening section or opening sections whose total length taken along the first direction at each of positions ranging in the second direction is almost constant regardless of the positions ranging in the second direction; and
an array of cylindrical lenses arranged on one of the first substrate and the second substrate, the cylindrical lenses extending in the first direction and arrayed in the second direction for separating incident light fluxes in the second direction,
wherein, in each row of the sub-pixels arrayed in the second direction, the opening sections are arranged such that moving average values of positions of a center of gravity of the opening sections fluctuate within a range equal to or less than about 5 μm, where the moving average values are calculated by obtaining positions of the center of gravity of the opening sections taken along the first direction at a plurality of positions ranging in the second direction and by averaging the positions of the center of gravity within a spot width for each of the plurality of positions ranging in the second direction, and the spot width is a width of a converged light formed on the liquid crystal layer when a parallel light flux enters one of the cylindrical lenses.

2. The liquid crystal display apparatus of claim 1, wherein each of the sub-pixels includes one or a plurality of opening sections arrayed in the second direction, and
the number of the one or the plurality of opening sections and shapes of the one or the plurality of opening sections are defined so as to make a longest period among fluctuation periods of the positions of the center of gravity of the one or the plurality of opening sections in each of the sub-pixels, almost equal to the spot width.

3. The liquid crystal display apparatus of claim 1, wherein each of the sub-pixels includes a color resist whose color is same as that of other sub-pixels neighboring in the second direction and is different from that of other sub-pixels neighboring in the first direction.

4. A light-emitting display apparatus comprising:
an array of sub-pixels arrayed in a first direction and a second direction, the first direction and second direction being perpendicular to each other, each of the sub-pixels including a light emitting section or light emitting sections whose total length taken along the first direction at each of positions ranging in the second direction is almost constant regardless of the positions ranging in the second direction; and
an array of cylindrical lenses arranged on one of first substrate and second substrate, the cylindrical lenses extending in the first direction and arrayed in the second direction for separating incident light fluxes in the second direction,
wherein, in each row of the sub-pixels arrayed in the second direction, the light emitting sections are arranged such that moving average values of positions of a center of gravity of the light emitting sections fluctuate within a range equal to or less than about 5 μm, where the moving average values are calculated by obtaining positions of the center of gravity of the light emitting sections taken along the first direction at a plurality of positions ranging in the second direction and by averaging the positions of the center of gravity within a spot width for each of the plurality of positions ranging in the second direction, and the spot width is a width of a converged light formed on the light-emitting sections when a parallel light flux enters one of the cylindrical lenses.

5. The light-emitting display apparatus of claim 4, wherein each of the sub-pixels includes one or a plurality of light emitting sections arrayed in the second direction, and
the number of the one or the plurality of light emitting sections and shapes of the one or the plurality of light emitting sections are defined so as to make a longest period among fluctuation periods of the positions of the center of gravity of the one or the plurality of light emitting sections in each of the sub-pixels, almost equal to the spot width.

6. The light-emitting display apparatus of claim 4, wherein the light emitting section or light emitting sections of each of the sub-pixels emit light whose color is same as that of other sub-pixels neighboring in the second direction and is different from that of other sub-pixels neighboring in the first direction.

* * * * *